US011356253B2

(12) United States Patent
Nakamura

(10) Patent No.: US 11,356,253 B2
(45) Date of Patent: *Jun. 7, 2022

(54) COMMUNICATION SYSTEM, FIRST COMMUNICATION DEVICE, SECOND COMMUNICATION DEVICE, METHOD, AND COMPUTER PROGRAM

(71) Applicant: NTI, Inc., Yokkaichi (JP)

(72) Inventor: Takatoshi Nakamura, Tokyo (JP)

(73) Assignee: NTI, INC., Mie (JP)

( * ) Notice: Subject to any disclaimer, the term of this patent is extended or adjusted under 35 U.S.C. 154(b) by 117 days.

This patent is subject to a terminal disclaimer.

(21) Appl. No.: 16/647,144

(22) PCT Filed: Sep. 18, 2018

(86) PCT No.: PCT/JP2018/034321
§ 371 (c)(1),
(2) Date: Jul. 31, 2020

(87) PCT Pub. No.: WO2019/054518
PCT Pub. Date: Mar. 21, 2019

(65) Prior Publication Data
US 2020/0366475 A1    Nov. 19, 2020

(30) Foreign Application Priority Data

Sep. 15, 2017    (JP) ................ JP2017-178351

(51) Int. Cl.
*H04L 9/08*    (2006.01)
*H04L 9/16*    (2006.01)
*H04L 9/40*    (2022.01)
(52) U.S. Cl.
CPC .......... *H04L 9/0861* (2013.01); *H04L 9/0838* (2013.01); *H04L 9/16* (2013.01); *H04L 63/0457* (2013.01)

(58) Field of Classification Search
CPC ....... H04L 9/0861; H04L 9/0838; H04L 9/16; H04L 63/0457; H04L 63/061; H04L 63/0428; H04L 63/068
See application file for complete search history.

(56) References Cited

U.S. PATENT DOCUMENTS 6,307,940 B1 * 10/2001 Yamamoto ............ H04L 9/0662
380/277
2011/0305334 A1 * 12/2011 Nakamura ................ H04L 9/14
380/255
(Continued)

FOREIGN PATENT DOCUMENTS

EP    2267937 A1    12/2010
JP    1212041 A    8/1989
(Continued)

OTHER PUBLICATIONS

International Search Report, PCT/JP2018/034321, dated Mar. 5, 2 pages.

*Primary Examiner* — Vu V Tran
(74) *Attorney, Agent, or Firm* — Edell, Shapiro & Finnan, LLC

(57) ABSTRACT

To propose a technique for solving a key delivery problem. Both of a client and a server have a function of generating the same solution at the same date and time based on the same initial solution. The client sends identification information for identifying the client to the server (S1002). The client and the server generate the same solution with time synchronization based on the initial solution (S1003 and S2002). The client and the server perform encrypted communication using the same key as a common key (S1004 and S2003).

11 Claims, 8 Drawing Sheets

(56) References Cited

U.S. PATENT DOCUMENTS

| | | | |
|---|---|---|---|
| 2017/0195316 A1* | 7/2017 | Murdoch | H04L 63/067 |
| 2017/0257359 A1* | 9/2017 | Ogawa | H04L 63/0853 |
| 2019/0273733 A1* | 9/2019 | Kawabata | H04L 63/104 |
| 2021/0150018 A1* | 5/2021 | Paaredi | G06F 21/44 |

FOREIGN PATENT DOCUMENTS

| | | |
|---|---|---|
| JP | 8204700 A | 8/1996 |
| JP | 2004109420 A | 4/2004 |
| JP | 2009253650 A | 10/2009 |
| JP | 201826631 A | 2/2018 |
| JP | 201846521 A | 3/2018 |
| WO | 2009123366 A1 | 10/2009 |
| WO | 2018030289 A1 | 2/2018 |
| WO | 2018052090 A | 3/2018 |

* cited by examiner

COMMUNICATION SYSTEM, FIRST COMMUNICATION DEVICE, SECOND COMMUNICATION DEVICE, METHOD, AND COMPUTER PROGRAM

TECHNICAL FIELD

The present invention relates to a communication technique and, more particularly, to an encrypted communication technique.

BACKGROUND ART

As it is widely known, for encrypted communication, a transmission device and a reception device use an algorithm and a key. As a technique of the encrypted communication, as it is widely known, there are a common key scheme in which the transmission device and the reception device use the same key and a public key scheme in which the transmission device and the reception device use different keys.

Although detailed explanation is omitted because both the schemes are well known, in general, processing is lighter in the encrypted communication of the common key scheme than the encrypted communication of the public key scheme. Therefore, currently, most of the encrypted communication is executed in the common key scheme. The encrypted communication of the public key scheme is only limitedly used for the transmission device and the reception device to safely share the same common key prior to performing communication in the common key scheme. For example, in the case of SSL (Secure Sockets Layer) communication widely used in browsing of web pages of the Internet, a transmission device (a server) and a reception device (a client) perform the encrypted communication with a common key. However, the encrypted communication of the public key scheme is used to safely transmit the common key, which the reception device originally has, from the reception device to the transmission device prior to the encrypted communication.

As it is evident from the above explanation, the transmission device and the reception device need to have the same key (common key) in order to perform the encrypted communication of the common key scheme. This is an inevitable condition for the encrypted communication of the common key scheme that requires a common algorithm and a common key for encryption processing and decryption processing.

Processing for such sharing of the key performed prior to the communication of the common key scheme is performed by transmitting the key, which the transmission device has, from the transmission device to the reception device, transmitting the key, which the reception device has, from the reception device to the transmission device, or transmitting the same key from a third device, which is neither the transmission device nor the reception device, to both of the transmission device and the reception device.

SUMMARY OF INVENTION

Technical Problem

In the processing for the transmission device and the reception device to share the common key, transmission and reception of the key is inevitable as explained above. It is a long-standing problem how to realize such transmission and reception of the key while achieving both of security and convenience. Such a problem is called "key delivery problem" in the encrypted communication of the common key scheme.

One method for solving such a problem is the encrypted communication of the public key scheme adopted in the SSL as well. It was said at least in a period in the past that the key delivery problem was solved by adopting the encrypted communication of the public key scheme. However, it has already been found that the security is not complete even with the encrypted communication of the public key scheme.

An object of the present invention is to provide a technique for at least partially solving the key delivery problem in the communication of the common key scheme.

Solution to Problem

In order to achieve this object, the present inventors repeatedly conducted research. As a result, the present inventor has noticed the extremely simple and essential fact that the problem described above does not occur if the key functioning as the common key is not transmitted via the Internet.

The present invention is based on such knowledge.

The present invention for achieving the above-described object is as follows.

The present invention is a communication system including a first communication device and a second communication device enabled to communicate with each other via a predetermined network.

The first communication device includes: first initial-solution recording means for recording an initial solution, which is data used to generate a solution in which a predetermined number of at least one of characters, numbers, and signs are enumerated; first solution generation means for generating a new solution, which is always same when generated by designating a same date and time, based on the initial solution recorded by the first initial-solution recording means; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The second communication device includes: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

This communication system includes the first communication device and the second communication device capable of communicating with each other via a network (typically, the Internet).

The first communication device and the second communication device perform at least one of processing for encrypting transmission target data and processing for decrypting encrypted data transmitted from the other device or at least one of transmission and reception of encrypted data. The first communication device and the second communication device are regarded as not more than one and the other of two communication devices. The first communication device can also function as the second communication device. The second communication device can also function as the first communication device.

The first communication device and the second communication device respectively include the first initial-solution recording means and the second initial-solution recording means. The same initial solution is recorded respectively in the first initial-solution recording means and the second initial-solution recording means. It is also possible that the initial solution is rewritten. However, the initial solution rewritten in the first initial-solution recording means and the initial solution rewritten in the second initial-solution recording means are set to the same. The first communication device and the second communication device respectively include the first solution generation means and the second solution generation means that can execute the same processing. Both of the first solution generation means and the second solution generation means generate a new solution, which is always the same when generated by designating the same date and time, based on the initial solution. With such a configuration, the first communication device and the second communication device can generate the same solution even if the first communication device and the second communication device are present in remote places and perform no communication therebetween. As a technique for making it possible to generate the same solution in such remote places, there has been known, for example, a technique of a onetime password widely spread in the fields of Internet banking and the like in recent years. In the technique of the onetime password, tokens owned by users and a server managed by a bank or the like can generate the same onetime password (solution) based on the same initial value. In the communication system of this application, the first communication device and the second communication device are capable of generating the same solution in the same manner as the tokens and the servers generating the same solution in such a technique. In the technique of the onetime password explained above, the same solution is generated in remote two places by performing the same arithmetic operation based on the common initial value. In the technique of the onetime password, as a generation method for generating a common key, there are a method (event synchronization) in which the same solution is generated in remote two places when the number of times an arithmetic operation is performed is the same and a method (time synchronization) in which solutions generated at the same date and time are the same. In the present invention, the first solution generation means and the second solution generation means that generate a new solution, which is always the same when generated by designating the same date and time, use the time synchronization. Consequently, the first communication device and the second communication device are configured to be able to generate the same solution using the same method as the time synchronization in the technique of the onetime password. If such time synchronization is adopted, it is possible to generate the same solution (a synchronized solution) even if transmission and reception of data is not performed between the first communication device and the second communication device for the purpose of generating the same solution.

The first communication device and the second communication device use the synchronized solution as an element for determining a method of encryption or decryption when performing the encrypted communication. Consequently, the first communication device and the second communication device can execute a method of encryption and a method of decryption that can decrypt corresponding, that is, encrypted transmission target data even if no communication is performed. The methods of encryption and decryption are determined by an algorithm and a key as explained above. The first encryption and decryption means in the first communication device and the second encryption and decryption means in the second communication device are capable of changing the methods of encryption and decryption in a synchronized state with each other by changing at least one of the key and the algorithm in the synchronized state with each other respectively using the solutions generated by the first solution generation means and the second solution generation means. For example, the first encryption and decryption means and the second encryption and decryption means typically use the solution as the key. Consequently, the first encryption and decryption means and the second encryption and decryption means are capable of, without performing delivery of the key, performing the encrypted communication while changing the methods of encryption and decryption using the same key changing in synchronized manner.

The change of the method of encryption and the method of decryption performed in the first encryption and decryption means and the second encryption and decryption means only has to be performed, for example, at least every time the first communication device and the second communication device perform communication. If delivery of the key or transmission and reception of data similar to the delivery of the key is not performed between the first communication device and the second communication device, it is possible to eliminate all risks caused by the delivery of the key.

Note that the first encryption and decryption means and the second encryption and decryption means include both of words of encryption and decryption. However, it is also possible that the first encryption and decryption means and the second encryption and decryption means perform only one of encryption and decryption.

The present inventor also proposes, as the communication device of the present invention, a first communication device constituting a communication system in the present invention. Effects by the first communication device are the same as the effects by the communication system in the present invention.

The first communication device is a first communication device constituting the communication system by, for example, being combined with a second communication device, the first communication device and the second communication device being enabled to communicate with each other via a predetermined network.

The first communication device includes: first initial-solution recording means for recording an initial solution, which is data used to generate a solution in which a predetermined number of at least one of characters, numbers, and signs are enumerated; first solution generation means for generating a new solution, which is always same when generated by designating a same date and time, based on the initial solution recorded by the first initial-solution recording means; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The second communication device combined with the first communication device includes: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

As explained above, the first communication device and the second communication device do not need to transmit and receive some data therebetween in order to make solutions generated by the first solution generation means and the second solution generation means respectively included in the first communication device and the second communication device same or generate the solutions in synchronization. On the other hand, the first communication device and the second communication device are capable of performing transmission and reception of data therebetween.

For example, the first communication device may include synchronization-information generation means for generating synchronization information for matching the solution generated by the second solution generation means of the second communication device with the solution generated by the first solution generation means. The first transmission and reception means may be configured to transmit the synchronization information to the second communication device prior to the first encryption and decryption means executing the processing for generating the encrypted data or the processing for generating the transmission target data. In that case, the second transmission and reception means of the second communication device combined with the first communication device may be configured to receive the synchronization information from the first communication device. The second solution generation means may be configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data. The date and time equally elapses in places where the first communication device and the second communication device are present even if the places are separated from each other. Therefore, it is basically possible to generate the same solution synchronized in the first communication device and the second communication device as long as a solution is generated using "the same initial solution" and "a date and time at that point in time" as variables. However, it is possible that it is difficult to generate the same solution in a synchronized state in the first communication device and the second communication device when clocks respectively included in the first communication device and the second communication device are out of order, when a certain degree or more of time is required for the processing executed by the first communication device and the second communication device, and when a certain degree or more of time is required for the communication performed between the first communication device and the second communication device.

Even in such a case, the first communication device generates the synchronization information, which is information necessary for specifying a date and time designated when the first solution generation means generates a solution, and transmits the synchronization information to the second communication device and the second solution generation means generates a solution referring to the synchronization information. Therefore, the solutions generated by the first solution generation means and the second solution generation means can be surely made the same. In this case, the synchronization information, so to speak, a clue for an outsider to estimate the solutions generated by the first communication device and the second communication device is transmitted and received on the network. However, even if the synchronization information falls into the outsider's hands, it is difficult for the outsider to correctly estimates, with the synchronization information alone, the solutions generated by the first communication device and the second communication device. Therefore, no particular problem occurs in security of communication.

The synchronization information is information for matching the solution generated by the second solution generation means of the second communication device with the solution generated by the first solution generation means. The synchronization information may be any information as long as it is possible to match the two solutions each other. For example, it is assumed that the first solution generation means and the second solution generation means generate different solutions in "minute" units. It is assumed that preliminary communication (for example, communication for requesting a communication start) for the first communication device and the second communication device to start the encrypted communication reaches from the first communication device to the second communication device at 20:42:00, Oct. 3, 2017. When the first solution generation means of the first communication device generates a solution before and after the date and time and the second generation means of the second communication device generates a solution after the date and time, for example, if there is a time lag in communication between the first communication device and the second communication device, it is also possible that the first solution generation means designates 20:41, Oct. 3, 2017 and the second solution generation means designates 20:42, Oct. 3, 2017 and the first solution generation means and the second solution generation means respectively generate different solutions. In such a case, information indicating to which of the former half and the latter half of that one minute (sixty seconds) a date and time including a second when the solution generated by the first solution generation means is specified belongs can be sent from the first communication device to the second communication device as the synchronization information. That is, when the preliminary communication reaches the second communication device at 20:42:00, Oct. 3, 2017 and the first solution generation means designates 20:41, Oct. 3, 2017 and generates a solution at 20:41:59, Oct. 3, 2017, synchronization information indicating "latter half" is sent from the first communication device to the second communication device. In a recent technique, the communication between the first communication device and the second communication device is unlikely to require as long as thirty seconds. Therefore, if the second communication device obtains the synchronization information indicating the "latter half", taking into account a date and time when data in the preliminary communication reaches the second communication device, the second communication device can grasp that the synchronization information used in the first solution generation means is generated designating the latter half of 20:41, Oct. 3, 2017 rather than the former half of 20:42, Oct. 3, 2017. If the second communication device obtains the synchronization information indicating "former half", the second communication device can grasp that the synchronization information used in the first solution generation means is generated in the former half of 20:42, Oct. 3, 2017. In this way, the first communication device and the second communication device can generate the same solution with the first solution generation means and the second solution generation means thereof.

On the other hand, the synchronization information may be information for specifying a date and time designated when at least a solution used first in the first encryption and decryption means is generated. This date and time does not always need to be a date and time at that point in time. Even if a date and time 10 years before or 10 years after is designated, the first solution generation means and the second solution generation means can generate the same solution. However, the synchronization information may be information for specifying a date and time at that point in time.

The synchronization information may be a part of the solution generated by the first solution generation means. In this case, the first solution generation means and the second solution generation means are desirably configured to generate solutions designating a date and time at that point in time. By using a part of the solution as the synchronization information, the first communication device and the second communication device can surely use the same solution. This is because the first solution generation means and the second solution generation means, which use the same initial solution, can always generate the same solution only if the first solution generation means and the second solution generation means designate the same date and time. For example, if there is no deviation between the clocks used by the first communication device and the second communication device and a time lag that occurs in communication between the first communication device and the second communication device is negligibly small, the first communication device and the second communication device can generate the same solution designating the same date and time. Then, the solutions generated by the first solution generation means and the second solution generation means should be the same in principle. Therefore, the second solution generation means should be able to generate a solution including a part of a solution sent from the first communication device. Then, it is guaranteed that the solution generated by the second solution generation means including a part of the solution sent from the first communication device is the same as the solution generated by the first communication device. In this way, it is possible to synchronize the solutions generated by the first solution generation means and the second solution generation means. Note that, when the solution generated by the second solution generation means does not include a part of the solution sent from the first communication device, the solution generated by the second solution generation means should be generated by designating a date and time within a some range before and after a date and time designated when the solution generated by the second solution generation means is generated. If the solution generated by the second solution generation means does not include a part of the solution sent from the first communication device, the second solution generation means only has to designate another date and time and attempt generation of a solution including a part of the solution sent from the first communication device. When a solution including a part of the solution sent from the first communication device appears in the solution generated by the second solution generation means, the solution is the solution generated by the first solution generation means of the first communication device.

Alternatively, the second solution generation means may be designed to generate a plurality of solutions from the beginning. For example, it is assumed that the first solution generation means and the second solution generation means generate different solutions in "minute" units. In this case, it is assumed that the first communication device and the second communication device perform preliminary communication for starting the encrypted communication each other at 20:42:00, Oct. 3, 2017. The first solution generation means of the first communication device generates a solution before and after the date and time. The first communication device extracts a part of the solution and sends the part of the solution to the second communication device. In this case, it is assumed that the first solution generation means of the first communication device designates a date and time 20:41, Oct. 3, 2017 in order to generate a solution. On the other hand, since the preliminary communication is performed at 20:42:00, Oct. 3, 2017, the second solution generation means of the second communication device can grasp that a date and time designated when the solution is generated by the first solution generation means of the first communication device is 20:42, Oct. 3, 2017 or a date and time before after the date and time. Therefore, the second solution generation means designates, for example, 20:40, Oct. 3, 2017, 20:41, Oct. 3, 2017, 20:42, Oct. 3, 2017, and 20:43, Oct. 3, 2017 and generates four solutions. A part of the solution sent from the first communication device coincides with a part of any one of the four solutions generated by the second solution generation means. By setting the solution, a part of which coincides, as the solution generated by the first solution generation means, it is possible to synchronize the solution generated by the first solution generation means and the solution generated by the second solution generation means or make the solutions the same. Note that, although the second solution generation means generates the four solutions in the example explained above, this is only an example. For example, if the first solution generation means and the second solution generation means change solutions in second units, more solutions should be generated by the second solution generation means. However, a principle itself for matching solutions in the first solution generation means and the second solution generation means may be as explained above. Note that, in this case, since a part of a character string used as a key for encryption in some case is transmitted and received between the first communication device and the second communication device, it seems that there is a problem in security of the encrypted communication. However, even if an outsider can acquire a part of a solution, the outsider cannot estimate the entire solution. Therefore, a problem does not occur in the security of the encrypted communication even if such a method is adopted. A part of the solution sent from the first communication device to the second communication device should have an information amount (the number of characters or the number of digits) in a degree for preventing the part of the solution from being probabilistically included in a plurality of solutions generated by the second communication device. For example, if the part of the solution is one character such as "1" or "p" or a character or a number of one digit, it is relatively highly likely that a solution generated by the second communication device includes such a character or number. Such a situation should be prevented from occurring.

The first solution generation means may be configured to generate, before the solution passed to the first encryption and decryption means, the solution generated by designating a date and time at that point in time or a solution for authentication, which is a part of the solution. The first transmission and reception means may be configured to transmit the solution for authentication to the second communication device. The second transmission and reception means of the second communication device combined with the first communication device may be configured to receive the solution for authentication. The second communication device may include authentication means for, when the second solution generation means successfully generates the same solution as the solution for authentication or a part of the solution, authenticating that the first communication device, which sends the solution for authentication to the second communication device, is authentic.

In this case, the solution sent from the first communication device to the second communication device or the solution for authentication, which is a part of the solution, has a characteristic different from a characteristic of the synchronization information. The first communication device may transmit such a solution or a part of the solution to the second communication device without transmitting the synchronization information. As explained above, after performing the preliminary communication, by designating a date and time at that point in time or several date and times before and after the date and time, the second solution generation means can generate the same solution as the solution generated by the first solution generation means. Conversely, as a result, the second solution generation means and the first solution generation means successfully generate the same solution. This proves that the first communication device and the second communication device have the same initial solution. According to such a logic, by using the solution for authentication, it is possible to perform authentication of the first communication device and eliminate masquerading as the first communication device by an outsider. Such authentication may be bidirectionally performed.

The solution for authentication may be a solution itself or a part of the solution. If the solution for authentication is a part of the solution rather than the solution itself, when the part of the solution is stolen by an outsider, it is possible to reduce likelihood that an initial solution and solutions to be generate thereafter are penetrated by the outsider. Note that, when the first communication device and the second communication device perform the encrypted communication, the solution for authentication can be prevented from being used to determine a method of encryption or decryption executed by the first encryption and decryption means and the second encryption and decryption means. In that case, the first solution generation means of the first communication device and the second solution generation means of the second communication device only have to generate a new common solution according to a rule determined in advance therebetween. The first encryption and decryption means and the second encryption and decryption means only have to use the new common solution for the encrypted communication.

The first solution generation means may be configured to generate a plurality of solutions. The first encryption and decryption means may be configured to perform at least one of processing for, when encrypting a piece of the transmission target data, executing a plurality of methods for encryption based on the plurality of solutions generated by the first solution generation means and processing for, when decrypting a piece of the encrypted data, executing a plurality of methods for decryption based on the plurality of solutions generated by the first solution generation means. In this case, the second solution generation means of the second communication device combined with the first communication device may be configured to generate a plurality of solutions. The second encryption and decryption means may be configured to perform at least one of processing for, when encrypting a piece of the transmission target data, executing a plurality of methods for encryption based on the plurality of solutions generated by the second solution generation means and processing for, when decrypting a piece of the encrypted data, executing a plurality of methods for decryption based on the plurality of solutions generated by the second solution generation means.

While one target data is transmitted and received in this way, it is possible to change a method for the encrypted communication. Consequently, it is possible to improve the security of the encrypted communication.

The present inventor also proposes, as an aspect of the present invention, the second communication device of the communication system explained above. Effects by the second communication device are the same as the effects by the communication system explained above.

The second communication device, which is an example, is a second communication device constituting a communication system in combination with a first communication device, the second communication device and the first communication device being enabled to communicate with each other via a predetermined network.

The first communication device combined with the second communication device includes: first initial-solution recording means for recording an initial solution, which is data used to generate a solution in which a predetermined number of at least one of characters, numbers, and signs are enumerated; first solution generation means for generating a new solution, which is always same when generated by designating a same date and time, based on the initial solution recorded by the first initial-solution recording means; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The second communication device includes: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

The present inventor also proposes, as an aspect of the present invention, a method executed by the first communication device of the communication system explained above. Effects by the method are equal to the effects of the communication system according to the present invention.

The method, which is an example, is a method executed in a first communication device constituting a communication system in combination with a second communication device, the first communication device and the second communication device being enabled to communicate with each other via a predetermined network.

The method includes processes executed by the first communication device including first initial-solution recording means for recording an initial solution, which is data used to generate a solution in which a predetermined number of at least one of characters, numbers, and signs are enumerated, the processes including: a first solution generation process of generating a new solution, which is always same when generated by designating a same date and time, based on the initial solution recorded by the first initial-solution recording means; first encryption and decryption process configured to change a method of encryption or decryption based on the solution generated in the first solution generation process, the first encryption and decryption process executing at least one of processing for encrypting transmission target data, which is a target of transmission, to generate encrypted data and processing for decrypting the encrypted data generated by the second communication device to generate transmission target data; and first transmission and reception process of executing at least one of processing for transmitting the encrypted data generated in the first encryption and decryption process to the second communication device and processing for receiving the encrypted data from the second communication device.

The second communication device combined with the first communication device includes: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

The present inventor also proposes, as an aspect of the present invention, a computer program for causing a computer, for example, a general-purpose computer to function as the first communication device of the communication system explained above.

The computer program, which is an example, is a computer program for causing a predetermined computer to function as a first communication device constituting a communication system in combination with a second communication device, the first communication device and the second communication device being enabled to communicate with each other via a predetermined network.

The computer program is a computer program for causing the computer to function as: first initial-solution recording means for recording an initial solution, which is data used to generate a solution in which a predetermined number of at least one of characters, numbers, and signs are enumerated; first solution generation means for generating a new solution, which is always same when generated by designating a same date and time, based on the initial solution recorded by the first initial-solution recording means; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The second communication device combined with the first communication device includes: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

The present inventor also proposes, as an aspect of the present invention, a method executed by the second communication device of the communication system explained above. Effects by the method are equal to the effects by the communication system according to the present invention.

The method, which is an example, is a method executed by a second communication device constituting a communication system in combination with a first communication device, the second communication device and the first communication device being enabled to communicate with each other via a predetermined network.

The first communication device combined with the second communication device includes: first initial-solution recording means for recording an initial solution, which is data used to generate a solution in which a predetermined number of at least one of characters, numbers, and signs are enumerated; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The method includes processes executed by the second communication device including second initial-solution recording means for recording a same initial solution as the initial solution recorded by the first initial-solution recording means of the first communication device, the processes including: a second solution generation process of generating a new solution, which is always same when generated by designating a same date and time, based on the initial solution recorded by the second initial-solution recording means, the new solution being same as the new solution generated by the first solution generation means of the first communication device; second encryption and decryption process configured to change a method of encryption or decryption based on the solution generated in the second solution generation process, the second encryption and decryption process executing at least one of processing for encrypting transmission target data, which is a target of transmission, to generate encrypted data and processing for decrypting the encrypted data generated by the first communication device to generate transmission target data; and second transmission and reception process of executing at least one of processing for transmitting the encrypted data generated in the second encryption and decryption process to the first communication device and processing for receiving the encrypted data from the first communication device.

The present inventor also proposes, as an aspect of the present invention, a computer program for causing a computer, for example, a general-purpose computer to function as the second communication device of the communication system explained above.

The computer program, which is an example, is a computer program for causing a predetermined computer to function as a second communication device constituting a communication system in combination with a first communication device, the first communication device and the second communication device being enabled to communicate with each other via a predetermined network.

The first communication device combined with the second communication device includes: first initial-solution recording means for recording an initial solution, which is data used to generate a solution in which a predetermined number of at least one of characters, numbers, and signs are enumerated; first solution generation means for generating a new solution, which is always same when generated by designating a same date and time, based on the initial solution recorded by the first initial-solution recording means; first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device.

The computer program is a computer program for causing the computer to function as: second initial-solution recording means for recording a same initial solution as the initial solution recorded by the first initial-solution recording means of the first communication device; second solution generation means for generating a new solution, which is always same when generated by designating a same date and time, based on the initial solution recorded by the second initial-solution recording means, the new solution being same as the new solution generated by the first solution generation means of the first communication device; second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device.

DESCRIPTION OF EMBODIMENT

A preferred embodiment of the present invention and modifications of the preferred embodiment are explained below. Inventions in the embodiment and the modifications can be combined as long as there is no contradiction in particular.

Figure 1:
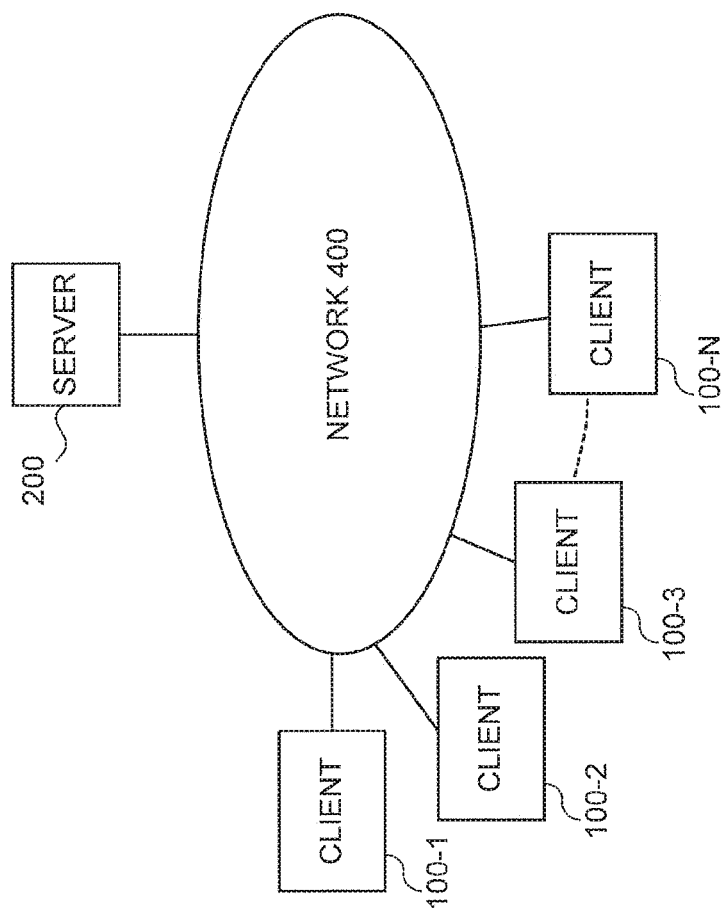
FIG. 1 is a diagram showing the entire configuration of a communication system according to one embodiment.

FIG. 1 schematically shows the entire configuration of a communication system as one preferable embodiment of a communication system of the present invention.

The communication system is configured by including a plurality of clients 100-1 to 100-N (hereinafter also simply described as "the client 100".), and a server 200. All of these can be connected to a network 400.

The network 400 is the Internet in this embodiment, although not limited to this.

The client 100 in this embodiment corresponds to a first communication device in the present application. Additionally, the server 200 in this embodiment corresponds to a second communication device in the present application. However, the server 200 and the client 100 corresponding to the first communication device and the second communication device in the present application do not need to be in the so-called server and client relationship, and may be two communication devices on an equal level with each other.

Although not limited to this, it is assumed that the communication system in this embodiment is (a part of) the Internet banking system, the server 200 is managed by a bank, and the clients 100-1 to 100-N are owned by respective users utilizing the Internet banking.

The client 100 includes a computer. More specifically, the client 100 in this embodiment is configured by a general-purpose computer.

Next, the configuration of the client 100 is described. The configuration of each of the clients 100-1 to 100-N is the same in connection with the present invention.

The client 100 is a mobile phone, a smart phone, a tablet, a notebook computer, a desktop personal computer, etc. All of these are required to be able to perform communication via the network 400, to generate functional blocks inside them that are described later by installing a computer program described later, and to perform processing described below, and as long as that is possible, the other specifications do not particularly matter.

For example, if the client 100 is a smartphone or a tablet, the client 100 functioning as the smartphone may be, for example, a product of an iPhone series manufactured and sold by Apple Japan, Inc. The client 100 functioning as the tablet may be a product of an iPad series manufactured and sold by Apple Japan, Inc. Hereinafter, although not limited to this, a description will be given by assuming that the client 100 is a smart phone.

Figure 2:
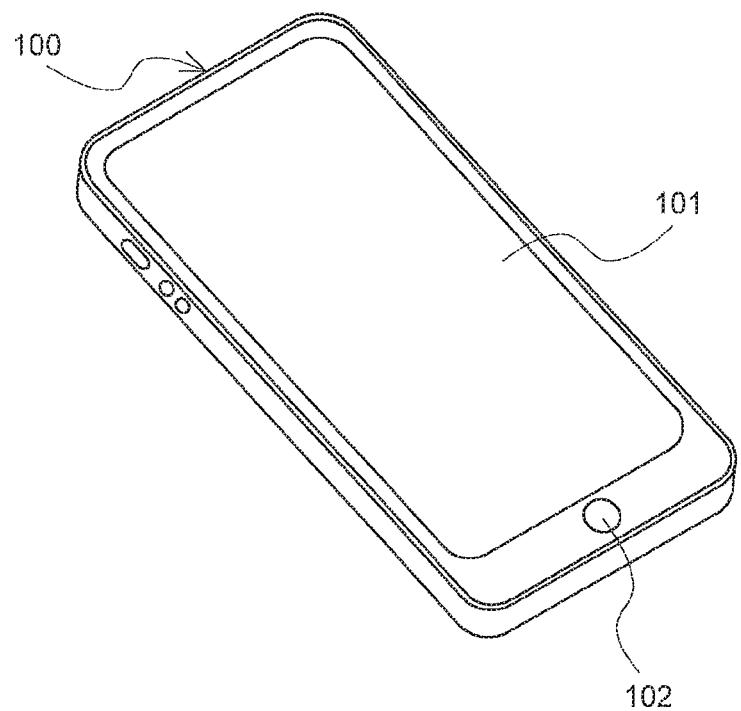
FIG. 2 is a diagram showing the external appearance of a client included in the communication system shown in FIG. 1.

An example of the external appearance of the client 100 is shown in FIG. 2.

The client 100 includes a display 101. The display 101 is for displaying a still image or a moving image, and a known or well-known display may be used for the display 101. The display 101 is, for example, a liquid crystal display. The client 100 also includes an input device 102. The input device 102 is for a user to carry out a desired input to the client 100. A known or a well-known input device can be used for the input device 102. Although the input device 102 of the client 100 in this embodiment is a button type input device, the input device 102 is not to be limited to this, and it is also possible to use a numeric keypad, a keyboard, a trackball, a mouse, etc. Especially, when the client 100 is a notebook computer or a desktop PC, the input device 102 will be a keyboard, a mouse, etc. Additionally, when the display 101 is a touch panel, the display 101 serves the function of the input device 102, and is made to do so in this embodiment.

Figure 3:
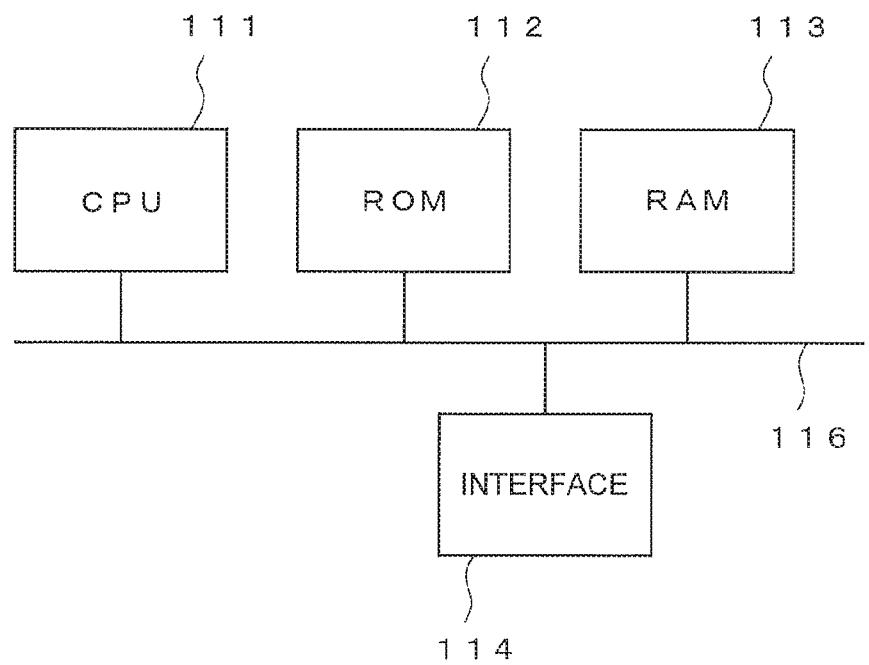
FIG. 3 is a diagram showing the hardware configuration of the client included in the communication system shown in FIG. 1.

The hardware configuration of the client 100 is shown in FIG. 3.

A hardware includes a CPU (central processing unit) 111, a ROM (read only memory) 112, a RAM (random access memory) 113, and an interface 114, and these are mutually connected by a bus 116.

The CPU 111 is an arithmetic device that performs calculation. The CPU 111 performs processing described later by, for example, executing a computer program recorded in the ROM 112 or the RAM 113. Although not shown, the hardware may include a large-capacity recording device such as a HDD (hard disk drive), and the computer program may be recorded in the large-capacity recording device.

The computer program as used herein includes at least a computer program for causing this client 100 to function as a client of the present invention. This computer program may be pre-installed in the client 100, or may be post-installed in the client 100. The installation of this computer program in the client 100 may be performed via a predetermined recording medium such as a memory card, or may be performed via a network such as a LAN or the Internet.

A computer program and data necessary for the CPU 111 to perform processing described later is recorded in the ROM 112. The computer program recorded in the ROM 112 is not limited to this, and when the client 100 is a smart phone, a computer program and data for causing the client to function as a smart phone, for example, a computer program and data for performing telephone calls and e-mails, are recorded. The client 100 is also enabled to browse homepages based on data received via the network 400, and a known web browser for making it possible is implemented in the client 100.

The RAM 113 provides a work area required for the CPU 111 to perform processing. Depending on the case, the above-described computer program and data may be recorded.

The interface 114 exchanges data between the CPU 111, the RAM 113, etc., which are connected to the interface 114 via the bus 116, and the outside. The above-described display 101 and input device 102 are connected to the interface 114. An operation content that is input from the input device 102 is input to the bus 116 from the interface 114. Additionally, as is well known, image data for displaying an image on the display 101 is output from the interface 114 to the display 101. The interface 114 is also connected to a transmission and reception mechanism (illustration is omitted), which is a known means for performing communication with the outside via the network 400, which is the Internet, thereby enabling the client 100 to transmit data via the network 400, and to receive data via the network 400. The transmission and reception of the data via this network 400 may be performed by wire, or may be performed wirelessly. For example, when the client 100 is a smart phone, this communication will be usually performed wirelessly. The configuration of the transmission and reception mechanism can be a known or well-known mechanism as long as it is possible. The data that the transmission and reception mechanism received from the network 400 is configured to be received by the interface 114, and the data given to the transmission and reception mechanism from the interface 114 is configured to be sent by the transmission and reception mechanism to the outside, for example, the server 200, via the network 400.

Figure 4:
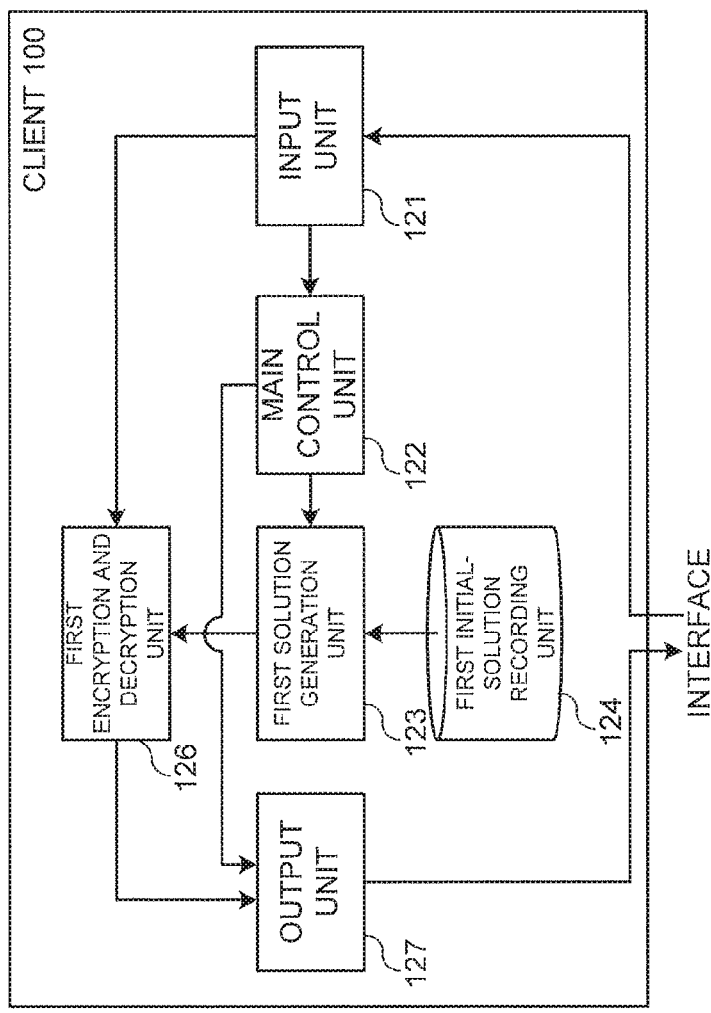
FIG. 4 is a block diagram showing the functional blocks generated inside the client included in the communication system shown in FIG. 1.

When the CPU 111 executes the computer program, the functional blocks as shown in FIG. 4 are generated inside the client 100. Note that, although the following functional blocks may be generated by the function of the above-described computer program alone for causing the client 100 to function as the first communication device of the present invention, the following functional blocks may be generated by the cooperation of the above-described computer program and a computer program such as an OS that is installed in the client 100.

In relationship with the functions of the present invention, an input unit 121, a main control unit 122, a first solution generation unit 123, a first initial-solution recording unit 124, a first encryption and decryption unit 126, and an output unit 127 are generated inside the client 100.

The input unit 121 receives an input from the interface 114.

The input from the interface 114 includes, for example, identification information (a user ID) described later, banking information that is information for making settlement, etc. via the Internet banking, etc. The identification information is information unique for each user for identifying the user among other users, and is generally called the user ID, etc. Each of these is input from the input device 102, and is input to the input unit 121 via the interface 114.

When the input unit 121 receives the data of the user ID, the input unit 121 is configured to send it to the main control unit 122, and when the input unit 121 receives the banking information, the input unit 121 is configured to send it to the first encryption and decryption unit 126.

The input unit 121 may also receive, via the interface 114, encrypted data that is sent from the server 200 and is received by the transmission and reception mechanism. The input unit 121 is configured to send the received encrypted data to the first encryption and decryption unit 126.

The main control unit 122 controls the entire functional blocks generated inside the client 100.

The main control unit 122 may receive the data of the user ID from the input unit 121. When the data of the user ID is received, the main control unit 122 sends it to the output unit 127, and sends an instruction to generate a solution to the first solution generation unit 123.

The first solution generation unit 123 generates a solution when the instruction to generate a solution is received. In this embodiment, the first solution generation unit 123 receives, from the main control unit 122, an instruction to generate a solution.

A method of generating a solution is explained below. The solution in this embodiment is a solution in which a predetermined number of at least one of characters, numbers, and signs are enumerated. The solution is generated based on an initial solution. Typically, the solution is a pseudo random number. In this embodiment, solutions are generated such that the numbers of digits or the numbers of characters thereof are always fixed. The solution is generated based on the initial solution by the first solution generation unit 123 by designating a certain date and time.

When generating a solution, the first solution generation unit 123 uses the data of an initial solution recorded in the first initial-solution recording unit 124. The data of the first initial solution is recorded in the first solution generation unit 123 in at least an initial state, i.e., the state before a first new solution is generated by the first encryption and decryption unit 126. The data of the initial solution affects the solution generated later. The data of the initial solution may have the same format as the data of a solution, i.e., a predetermined number of series of at least one of characters, numbers, and signs, and the number of digits or the number of characters of the solution may be or may not be the same as that of the solution. However, in this embodiment, although not limited to this, the data of the initial solution is configured to have the same format as the data of a solution. It is possible that the data of the initial solution is updated as explained below.

The first solution generation unit 123 is configured to send the generated solution to the first encryption and decryption unit 126.

The first encryption and decryption unit 126 performs at least one of encryption processing and decryption processing, and is configured to perform both of the encryption processing and the decryption processing in this embodiment, although not limited to this.

The first encryption and decryption unit 126 performs the processing of the encryption when receiving banking information from the input unit 121. The first encryption and decryption unit 126 performs the processing of the decryption when receiving encrypted data from the input unit 121.

Since details of a method of encryption are explained below, the method is briefly explained here. When performing the encryption, prior to the encryption, the first encryption and decryption unit 126 receives a solution from the first solution generation unit 123. The solution is used for the encryption in the first encryption and decryption unit 126. The method of encryption changes based on the solution. Although not limited to this, data encrypted in this embodiment is data of banking information generated by operation of the input device 102. The data of the banking information generated by the operation of the input device 102 is a plaintext. However, the data of the banking information changes to encrypted data as a result of being encrypted by the first encryption and decryption unit 126. The encrypted data generated by the first encryption and decryption unit 126 is sent to the output unit 127.

Since details of a method of decryption are explained below, the method is briefly explained here. When performing the decryption, prior to the decryption, the first encryption and decryption unit 126 receives a solution from the first solution generation unit 123. The solution is used for the decryption in the first encryption and decryption unit 126. The method of decryption changes according to the solution. Although not limited to this, data decrypted in this embodiment is data of banking information (described later) sent from the server 200. Although the banking information sent from the server 200 is in the state of encrypted data, it becomes plaintext data of the banking information as a result of decryption by the first encryption and decryption unit 126. The banking information of the plaintext generated by the first encryption and decryption unit 126 is sent to the output unit 127.

The output unit 127 outputs the data generated by the functional blocks in the client 100 to the interface 114.

As described above, the identification information may be sent to the output unit 127 from the main control unit 122. The output unit 127 outputs such identification information to the interface 114. This identification information is configured to be sent from the interface 114 to the transmission and reception mechanism, and are sent to the server 200 via the network 400 from the transmission and reception mechanism.

The encrypted data may also be sent to the output unit 127 from the first encryption and decryption unit 126. When the encrypted data is received, the output unit 127 outputs the encrypted data to the interface 114. This encrypted data is configured to be sent from the interface 114 to the transmission and reception mechanism, and to be sent from the transmission and reception mechanism to the server 200 via the network 400.

The plaintext data of the banking information may also be sent from the first encryption and decryption unit 126 to the output unit 127. This banking information is originally generated by the server 200. When such data of the banking information is received, the output unit 127 outputs the data of the banking information to the interface 114. The data of the banking information is sent to the display 101, and the display 101 that received it performs display according to the banking information.

Next, the configuration of the server 200 is described.

When seen as hardware, the server 200 may be an existing known or well-known server. Additionally, its hardware configuration may also be a general configuration, and in broad terms, it is possible to follow the hardware configuration of the client 100 in which the CPU 111, the ROM 112, the RAM 113, and the interface 114 are connected by the bus 116. However, the server 200 will generally include a large-capacity recording device such as a HDD.

The configurations and functions of a CPU, a ROM, a RAM, an interface, a bus, and the large-capacity recording device included in the server 200 are not different from the configurations and functions of those in the client 100. Additionally, the interface included in the server 200 is connected to the transmission and reception mechanism for performing communication with equipment other than the server 200 via the network 400, similar to the transmission and reception mechanism included in the client 100. Although the interface included in the server 200 may be connected to a display and an input device similar to those included in the client 100, a description thereof is omitted since it is less relevant to the present application.

By executing the computer program recorded in the ROM, the large-capacity recording device, etc. inside the server 200, the functional blocks as described below are generated inside the server 200. Although the following functional blocks may be generated by the function of the computer program alone for causing the server 200 to function as the second communication device in the present invention, the following functional blocks may be generated by the cooperation of such a computer program and a computer program such as an OS installed in the server 200. Additionally, although the above-described computer program may be pre-installed in the server 200, or the computer program may be post-installed in the server 200. In that case, installation of the above-described computer program to the server 200 may be performed via a predetermined recording medium such as a memory card, or may be performed via a network such as a LAN or the Internet. These circumstances are the same as those in the case of the client 100.

Figure 5:
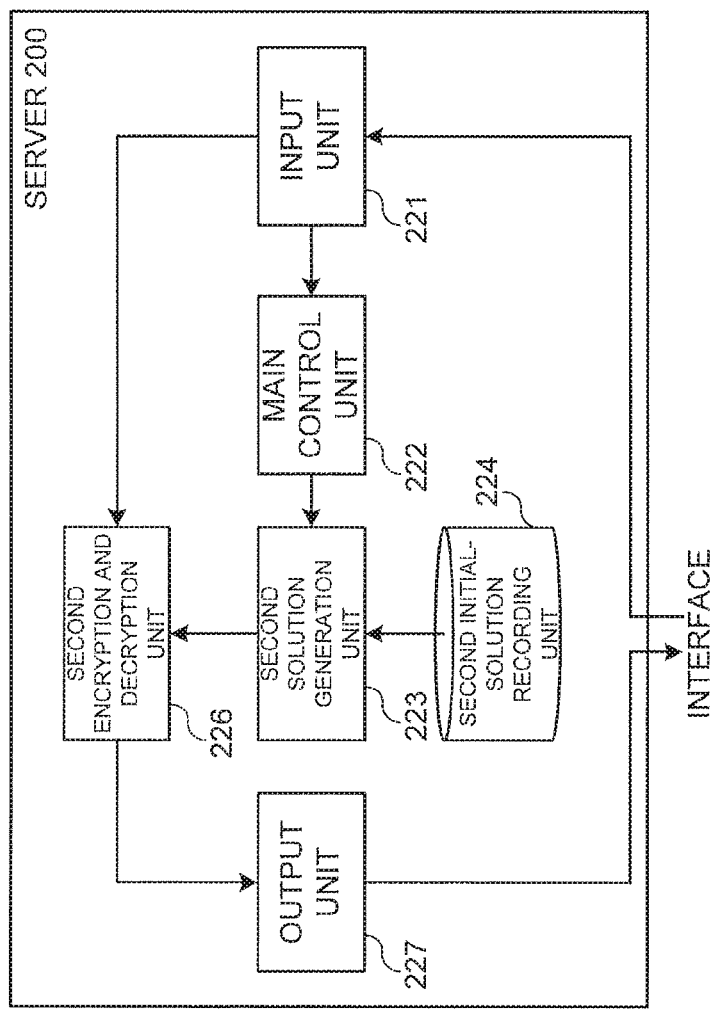
FIG. 5 is a block diagram showing the functional blocks generated inside a server included in the communication system shown in FIG. 1.

In relationship with the functions of the present invention, an input unit 221, a main control unit 222, a second solution generation unit 223, a second initial-solution recording unit 224, a second encryption and decryption unit 226, and an output unit 227 are generated in the server 200 (FIG. 5).

The input unit 221 receives an input from an interface.

The input from the interface includes, for example, banking information, etc., which is information about whether the settlement asked by a user in the Internet banking is approved, etc. The banking information is input from, for example, another device other than the server 200 performing the Internet banking, and is input to the input unit 221 via the interface. However, when it is the server 200 itself that performs the Internet banking, such banking information may be input to the input unit 221 from a functional block (not shown) in the server 200 that performs the Internet banking and generates banking information without using the interface.

The input unit 221 may receive data of the identification information from the interface. The identification information is sent from the client 100 via the network 400, and is received by the server 200 with its transmission and reception mechanism. When the identification information is received, the input unit 221 is configured to send them to the main control unit 222.

Similarly, the input unit 221 may receive the encrypted data via the interface that is sent from the client 100 via the network 400, and is received by the server 200 with its transmission and reception mechanism. When such encrypted data is received from the interface, the input unit 221 is configured to send it to the second encryption and decryption unit 226.

The main control unit 222 controls the entire functional blocks generated inside the server 200.

The main control unit 222 may receive the identification information from the input unit 221. When these data are received, the main control unit 222 is configured to send an instruction to generate a solution in addition to the identification information to the second solution generation unit 223.

The second solution generation unit 223 generates a solution, when the instruction to generate a solution is received. The second solution generation unit 223 receives the instruction to generate a solution from the main control unit 222.

Although the method of generating a solution is described later, it is assumed that the generation of the solution performed by the second solution generation unit 223 is performed by the same method as the generation of the solution performed by the first solution generation unit 123 of the client 100.

When generating the first solution, the second solution generation unit 223 also uses the data of the initial solution recorded in the second initial-solution recording unit 224, as in the first solution generation unit 123 that uses the data of the initial solution recorded in the first initial-solution recording unit 124. The data of the initial solution recorded in the second initial-solution recording unit 224 is the same as that recorded in the first initial-solution recording unit 124. However, in order to perform the encrypted communication with the clients 100, the second solution generation unit 223 needs to generate different solutions for users who operate the clients 100. Therefore, at least in an initial state (a state in which the second solution generation unit 223 has not generate solutions for all the users yet), data of initial solutions for the users as many as the number of users are recorded in the second solution generation unit 223. The initial solutions for the users are the same as first initial solutions recorded in the first initial-solution recording units 124 of the clients 100 of the users. In this embodiment, in order to enable to grasp for which users the initial solutions are, the data of the initial solutions are recorded in the second initial-solution recording units 224 in a state in which the data of the initial solutions are linked with identification information of the users. The initial solutions linked with the identification information recorded in the second initial-solution recording unit 224 are set to be the same as initial solutions recorded in the first initial-solution recording units 124 of the clients 100 scheduled to be used by the users specified by the identification information linked with the initial solutions. The initial solutions linked with the identification information are sometimes respectively updated as explained below. When being updated, the initial solutions linked with the identification information are updated, as explained below, in synchronization with the initial solutions recorded in the first initial-solution recording units 124 in the clients 100 of the users specified by the identification information linked with the initial solutions. As a result, the initial solutions linked with the identification information are set to be always the same as the initial solutions recorded in the first initial-solution recording units 124 of the clients 100 scheduled to be used by the users specified by the identification information linked with the initial solutions.

As explained above, the second solution generation unit 223 receives, from the main control unit 222, an instruction to generate a solution and identification information. When receiving such an instruction and identification information, the second solution generation unit 223 generates a solution. The second solution generation unit 223 is configured to, when generating a solution, read out, from the second initial-solution recording unit 224, data of an initial solution linked with the same identification information as the identification information received together with the instruction to generate a solution. The second solution generation unit 223 is configured to generate a solution using the read-out initial solution. A method with which the second solution generation unit 223 generates a solution is the same as the method with which the first solution generation units 123 in the clients 100 generate solutions. The second solution generation unit 223 performs the generation of a solution by designating a date and time like the first solution generation units 123. Consequently, the solution generated by the second solution generation unit 223 is set to be the same as the solutions generated by the first solution generation units 123 in the clients 100.

The second solution generation unit 223 is configured to send the generated solution to the second encryption and decryption unit 226.

The second encryption and decryption unit 226 performs at least one of encryption processing and decryption processing, and is configured to perform both of the encryption processing and the decryption processing in this embodiment, although not limited to this. Further, when the first encryption and decryption unit 126 of the client 100 only performs encryption, the second encryption and decryption unit 226 can perform only decryption, and when the first encryption and decryption unit 126 only performs decryption, the second encryption and decryption unit 226 can perform only encryption.

The second encryption and decryption unit 226 performs the processing of the encryption when receiving banking information from the input unit 221. The second encryption and decryption unit 226 performs the processing of the decryption when receiving encrypted data from the input unit 221.

The method of encryption and the method of decryption performed in the second encryption and decryption unit 226 are equal to the methods of encryption and decryption performed in the first encryption and decryption unit 126 of the client 100.

Since details of the method of encryption are explained below, the method of encryption is briefly explained here. When performing the encryption, prior to the encryption, the second encryption and decryption unit 226 receive a solution from the second solution generation unit 223. The solution is used for encryption executed in the second encryption and decryption unit 226. The method of encryption is changed based on the solution. Although not limited to this, the data encrypted in this embodiment is the data of the banking information that is input from the interface. Although the banking information is plaintext data, it becomes encrypted data as a result of encryption by the second encryption and decryption unit 226. The encrypted data generated by the second encryption and decryption unit 226 is configured to be sent to the output unit 227.

Since details of the method of decryption are explained below, the method of decryption is briefly explained here. When the decryption is performed, prior to the decryption, the second encryption and decryption unit 226 receives a solution from the second solution generation unit 223. The solution is used for the decryption in the second encryption and decryption unit 226. The method of decryption is changed based on the solution. Although not limited to this, data decrypted in this embodiment is encrypted data concerning banking information sent from the client 100. As a result of decryption of the encrypted data by the second encryption and decryption unit 226, it becomes plaintext data of the banking information. The plaintext banking information generated by the second encryption and decryption unit 226 is configured to be sent to the output unit 227.

The output unit 227 outputs the data generated by the functional blocks in the server 200 to the interface.

The encrypted data may be sent from the second encryption and decryption unit 226 to the output unit 227. When the encrypted data is received, the output unit 227 outputs the encrypted data to the interface. This encrypted data is configured to be sent from the interface to the transmission and reception mechanism, and to be sent from the transmission and reception mechanism to the client 100 via the network 400.

The plaintext data of the banking information may also be sent from the second encryption and decryption unit 226 to the output unit 227. This banking information is originally generated by the client 100. When such data of the banking information is received, the output unit 227 outputs the data of the banking information to the interface. The data of banking information is sent from the interface to other device that performs processing of the Internet banking. However, when other functional blocks in the server 200 perform Internet banking processing, the banking information will be sent to the functional blocks, which are not shown, without passing through the interface.

Figure 6:
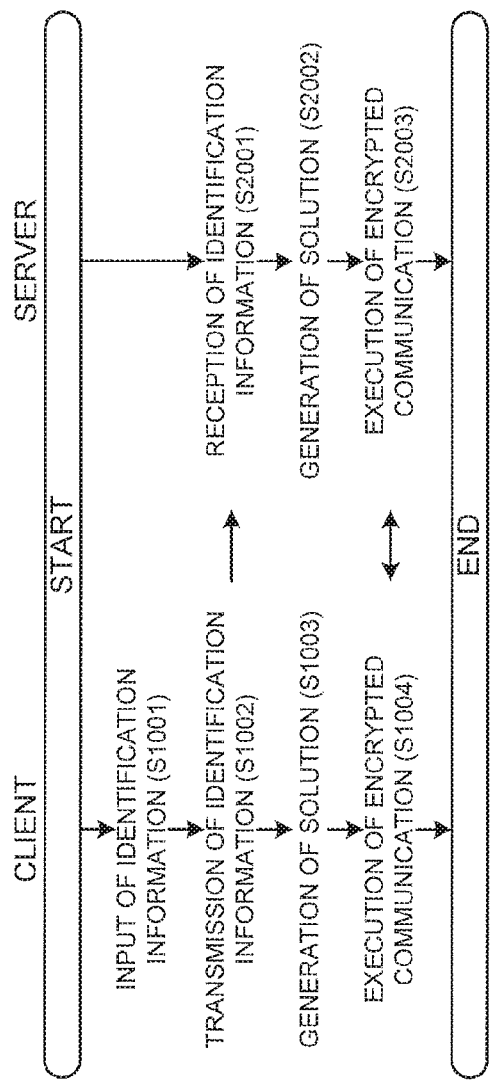
FIG. 6 is a diagram showing the flow of processing performed when communication is performed in the communication system shown in FIG. 1.
Figure 7:
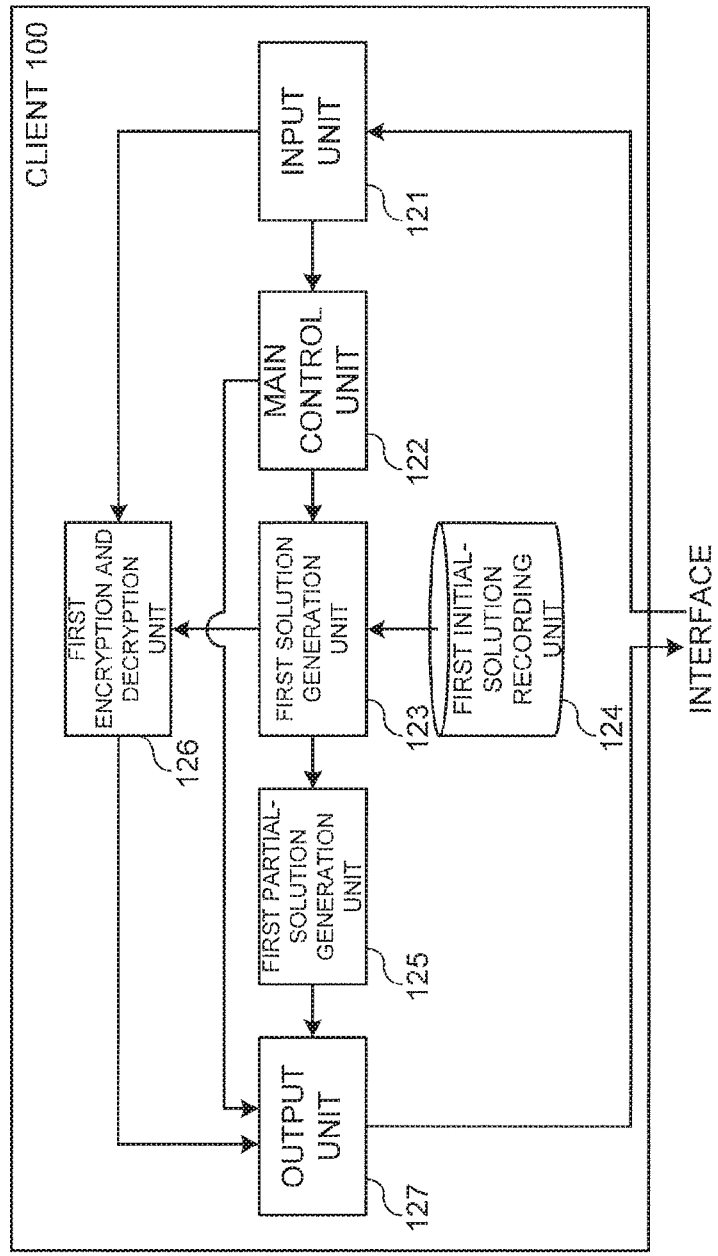
FIG. 7 is a block diagram showing functional blocks generated on the inside of a client included in a communication system in a modification 2.
Figure 8:
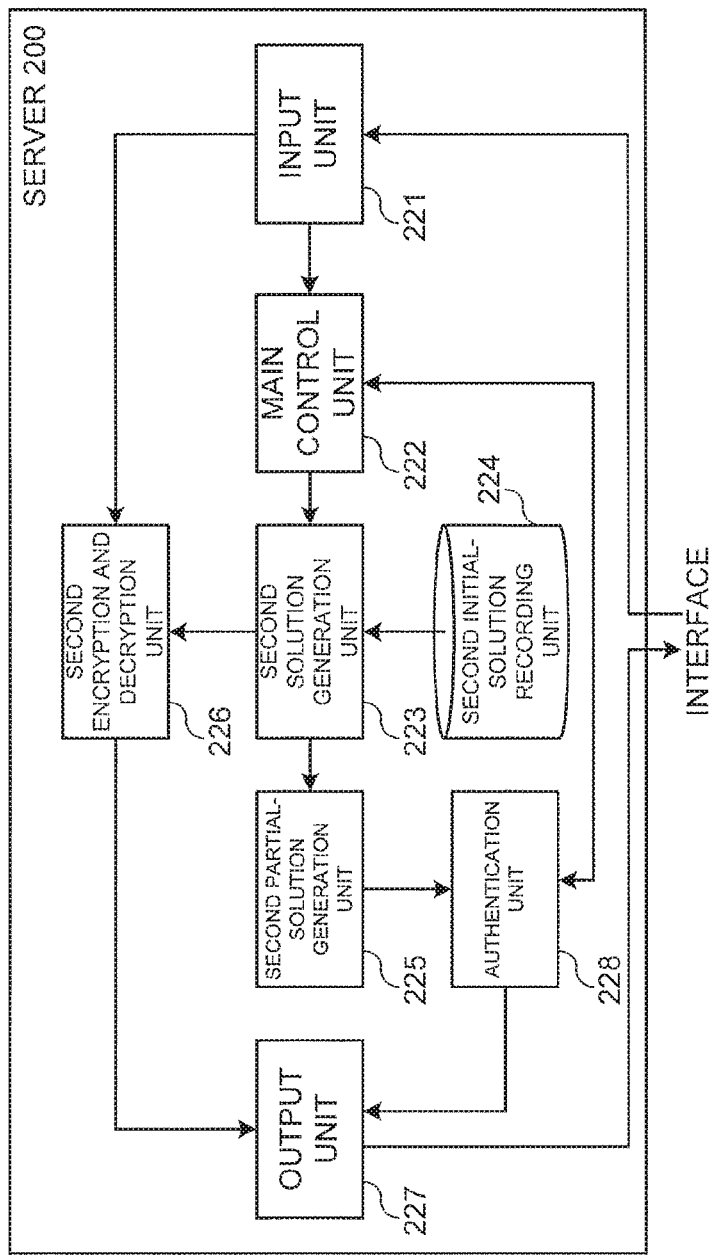
FIG. 8 is a block diagram showing functional blocks generated inside a server included in a communication system according to a modification 2.

Next, referring to FIG. 6, the usage and operation of the above-described communication system are described.

The user who is going to utilize the Internet banking first operates the input device 102 of the client 100 owned by the user, and launches a browser. The functions of the browser depend on a known or well-known computer program usually included in the client 100. The browser is displayed on the display 101 of the client 100.

The user inputs the URL of the server 200 providing the Internet banking to an address bar of the browser. Accordingly, the homepage of the Internet banking is displayed on the browser.

Here, the user inputs a user ID, which is the identification information (S1001). A known or well-known display to prompt the input of the user ID may be made in the homepage of the Internet banking in this state, so as to prompt the user to input the user ID. The user operates the input device 102 to input the identification information. The input data of the identification information is sent to the input unit 121 via the interface 114, and is sent from the input unit 121 to the main control unit 122.

When the identification information is received, the main control unit 122 sends the identification information to the output unit 127. The identification information is sent from the output unit 127 to a transmission and reception unit through the interface 114 and sent from the transmission and reception unit to the server 200 via the network 400 (S1002).

The server 200 receives, in the transmission and reception mechanism thereof, data of the identification information sent from the client 100 (S2001). In this embodiment, practically, the transmission of the identification information from the client 100 to the server 200 is a request for a communication start between the client 100 and the server 200 transmitted to the server 200 by the client 100. Naturally, it is also possible to transmit, according to a publicly-known or well-known technique, from the client 100 to the server 200, data other than the identification information meaning that a request for communication is performed.

The identification information is sent from the transmission and reception unit to the interface and sent from the interface to the input unit 221 in the server 200. The input unit 221 sends the data of the identification information to the main control unit 222.

The main control unit 222 sends the data of the identification information to the second solution generation unit 223.

On the other hand, generation of a solution is performed in the client 100 (S1003). Generation of a solution is also performed in the server (S2002).

Processing of the generation of a solution performed in the client 100 and processing of the generation of a solution performed in the server 200 are independently executed. Whichever of the processing of the generation of a solution performed in the client 100 and the processing of the generation of a solution performed in the server 200 may be performed first. The processing of the generation of a solution performed in the client 100 and the processing of the generation of a solution performed in the server 200 may be simultaneously performed.

A method of generation of a solution in the client 100 is explained.

When sending the identification information received from the input unit 121 to the output unit 127 as explained above, the main control unit 122 of the client 100 sends an instruction to generate a solution to the first solution generation unit 123.

The first solution generation unit 123, which receives such an instruction, generates a solution.

When generating a solution, the first solution generation unit 123 reads out the initial solution from the first initial-solution recording unit 124. As explained above, the initial solution is a solution in which at least one of characters, numbers, and signs are enumerated.

Although any kind of method of generating a solution may be used, in this embodiment, the technology of time synchronization in the conventional technology of one-time password is applied, although not limited to this. An example of the generation method of a solution is described below.

The first solution generation unit 123 in this embodiment reads the data of the initial solution recorded first in the first initial-solution recording unit 124, when generating a solution for the first time (note that, in this embodiment, the initial solution is always used whenever generating a solution, in addition to the first time). It is assumed that the data of the initial solution is, for example, a character string including a 20 digit number and lower-case alphabetical characters. Such an initial solution is unique to each client 100, and the server 200 or an administrator of the server 200 assigns the initial solution to each client 100. Although there may be one initial solution, it is assumed that there are five initial solutions in this embodiment. The first solution generation unit 123 reads all of the five initial solutions.

The first solution generation unit 123 performs calculation on these initial solutions, thereby generating the solution at the time. First, the initial solution is converted into numbers only, so that calculation is possible. When an alphabetical character is included in the initial solution, it is replaced with a double digit number. The number to be replaced is the order of the alphabetical character in the alphabet. For example, "a" is replaced with "01", "b" is replaced with "02", . . . and "z" is replaced with "26", respectively. For example, supposed the initial solution is "5a6458p6556ff4272149." In this case, when the initial solution is converted into numbers only according to the above-described rule, it becomes "50164581665560606064272149". The number of digits in the case of conversion into numbers only will be increased according to the number of alphabetical characters included in the initial solution. Further, when it is desired to also include signs such as (, ), !, &, and : in the solution, suitable numbers such as "27", "28", and "29" may be assigned to "(", ")", and "!", respectively.

Next, calculation is performed on numbers. A sequence of numbers that serves as the origin of a solution is obtained as a result of this calculation. When an obtained solution is represented as X, X is calculated as explained below according to year, month, day, hour, and minute at that point in time. That is, a date and time designated to realize time synchronization in this embodiment is "a date and time at that point in time when the first solution generation unit 123 is about to generate a solution". $X_1$, $X_2$, $X_3$, $X_4$, and $X_5$ in the following formula are obtained by converting the five initial solutions to numbers, respectively. The reason for using the five initial solutions in this embodiment is that a solution is changed according to the five elements, i.e., the year of A.D., the month, the day, the hour, and the minute.

$$X=X_1^P+X_2^Q+X_3^R+X_4^S+X_5^T$$

Here, P=the value obtained by adding 1 to the remainder obtained by dividing the number of the year of A.D. by 5, Q=the value obtained by adding 1 to the remainder obtained by dividing the number of the month by 5, R=the value obtained by adding 1 to the remainder obtained by dividing the number of the day by 5, S=the value obtained by adding 1 to the remainder obtained by dividing the number of the hour by 5, and T=the value obtained by adding 1 to the remainder obtained by dividing the number of the minute by 5. In this manner, a different sequence of numbers can be obtained according to the time at that moment. Further, when all of P to T incidentally become 0, the solution X eventually obtained is 5, but in order to avoid the frequent occurrence of such a simple number, a process of adding 1 in all of P to T is added.

In addition, for example, when the formula as follows is used, just one initial solution to be used is needed.

$$X=X_1^P X_1^Q+X_1^R X_1^S+X_1^T$$

As a result of performing the above-described calculation, the sequence of numbers X, which serves as the origin of a solution, is obtained. Then, if the number of 01 to 26 is included in arbitrary double digits in the sequence of numbers, according to the opposite rule of the aforementioned rule of replacing alphabetical characters into numbers, these numbers are replaced with alphabetical characters of a to z.

A character string mixed with numbers and lower case alphabets obtained in this way has the number of digits equal to or more than twenty at a probability as close as possible to 100%. When it is 20 or more digits, for example, the first 20 characters are extracted from the character string, and it is used as a solution. When the character string including numbers and lower-case alphabetical characters obtained as described above is exactly 20 digits, it is used as a solution as it is. Additionally, when the character string including numbers and lower-case alphabetical characters obtained as described above is less than 20 digits, the number of digits is increased based on a certain regulation. For example, based on the first number or alphabetical character of the character string, a certain number or character may be inserted into the character string until the number of digits reaches 20. Alternatively, a method may be adopted that repeats an operation of generating a new character string including numbers and lower-case alphabetical characters by performing the above-described process of replacing numbers with alphabetical characters with respect to the sequence of numbers obtained by performing the calculation by substituting P with T in the above-described formula, and joining the new character string to the original character string including numbers and lower-case alphabetical characters until the number of digits becomes at least 20, and the first 20 characters are extracted and used as a solution.

In any case, accordingly, the solution corresponding to the day and time at the time is generated.

The first solution generation unit 123 sends the generated solution to the first encryption and decryption unit 126.

On the other hand, a solution is also generated in the second solution generation unit 223 of the server 200.

As explained above, the second solution generation unit 223 receives, from the main control unit 222, the instruction to generate a solution and the identification information. The second solution generation unit 223 performs, on the second initial-solution recording unit 224, a search about whether the same identification information as the received identification information is present. If the second solution generation unit 223 finds, in the second initial-solution recording unit 224, the same identification information as the identification information received from the main control unit 222, the second solution generation unit 223 reads out an initial solution linked with the identification information. This initial solution is the same as the solution recorded in the first initial-solution recording unit 124 of the client 100, which sends the identification information, and used when the solution is generated in the first solution generation unit 123.

Subsequently, the second solution generation unit 223 determines a date and time designated to generate a solution. Such a date and time is "a date and time at that point in time when the second solution generation unit 223 is about to generate a solution" as in the case in which a solution is generated in the client 100.

The second solution generation unit 223 generates a new solution using the same formula and the same rule as the formula and the rule used when the first solution generation unit 123 generates a solution.

As it is evident from the fact that year, month, day, hour, and minute are used in the formula described above, even if the same initial solution is used, when "minute" of time gains one minute, solutions respectively generated in the client 100 and the server 200 vary. However, in the present technical level, it is easy to match both of clocks used in the client 100 and the server 200 to, for example, the Greenwich Mean Time with no deviation of even 0.1 second. Time from timing when generation of a solution is started in the client 100 after the identification information is sent from the client 100 to timing when the server 200, which receives the identification information via the network 400, starts generation of a solution is less than one minute even if a time lag until the identification information reaches from the client 100 to the server 200 is considered. Therefore, for example, in particular, when a restriction for, for example, limiting the server 200 and the client 100 in this embodiment to be used in the same country is provided, a solution generated by the second solution generation unit 223 of the server 200 coincides with a solution generated by the first solution generation unit 223 of the client 100 unless something unexpected happens.

If the solutions do not coincide, this means that encrypted communication explained below cannot be performed between the client 100 and the server 200. Therefore, in that case, the processing only has to be performed again from S1001 by transmitting an instruction to perform the processing again from the beginning from the server 200 to the client 100 via the network 400. To avoid imposing such a burden on the user, when it is attempted to designate, with the second solution generation unit 223 of the server 200, for example, 18:12, Sep. 17, 2017, which is a date and time at that point in time and generate a solution, eleven solutions from 18:07, Sep. 17, 2017 to 18:17, Sep. 17, 2017 designating five minutes before and after the date and time only have to be generated. Regardless of how large a time lag in communication is or regardless of slight deviation present between the clocks used by the client 100 and the server 200, among the eleven solutions generated by the server 200, the same solution as the solution generated by the client 100 should be present.

Irrespective of whether the second solution generation unit 223 generates only one solution or generates a plurality of solutions, the second solution generation unit 223 sends the generated solution or solutions to the second encryption and decryption unit 226.

Consequently, preparation for the encrypted communication is completed. In this state, encrypted communication is performed between the client 100 and the server 200 (S1004, 2003).

First, the case is described where encrypted data is transmitted from the client 100 to the server 200.

Note that, as for the transmission of encrypted data from the client 100 to the server 200, and the transmission of encrypted data from the server 200 to the client 100 described later, it does not matter which of these transmissions is performed first. Rather, both of these transmissions are performed as needed. Additionally, as for the generation of a new solution in the first solution generation unit 123 described later, and the generation of a new solution in the second solution generation unit 223, it also does not matter which of these generations is performed first. The generation of a new solution performed in both of the client 100 and the server 200 is independently performed.

The user operates the input device 102 of the client 100 to input banking information. The banking information is, for example, indication of intention to check the balance, information specifying a bank account for which the balance is to be checked, indication of intention to perform money transfer to another account, information specifying the amount of money to be transferred, information specifying an account to which money is to be transferred, etc. The banking information about these is generated by operating the input device 102, the data of the banking information is plaintext data.

The data of the banking information is sent from the interface 114 to the input unit 121, and is further sent to the first encryption and decryption unit 126. The data of the banking information is encrypted. The solution received from the first solution generation unit 123 explained above is used to encrypt the data of the banking information.

A method of using the solution in this case is optional. A method of encryption executed by the first encryption and decryption unit 126 is changed by using the solution. In general, the method of encryption is determined by an algorithm and a key. Therefore, at least one of the algorithm and the key is changed by the solution. Although not limited to this, in this embodiment, it is assumed that the key is changed by the solution. For example, if the algorithm is changed, a method of selecting, with the solution, one of a plurality of kinds of algorithms prepared in advance is conceivable. To change the key with the solution, the solution itself may be used as the key or there is a method of using the solution as a part of the key or performing some determined arithmetic operation on the solution to change the solution to the key. In this embodiment, it is assumed that the solution is directly used as the key.

In any case, the plaintext banking information is encrypted by the first encryption and decryption unit 126, and is converted into encrypted data.

The generated encrypted data is sent from the first encryption and decryption unit 126 to the output unit 127.

The output unit 127 sends the encrypted data to the transmission and reception mechanism via the interface 114. The encrypted data is sent to the server 200 via the network 400.

The server 200 receives the encrypted data sent from the client 100 with its transmission and reception mechanism. The encrypted data is sent from the transmission and reception mechanism to the input unit 221 via the interface. The input unit 221 sends the encrypted data to the second encryption and decryption unit 226.

The second encryption and decryption unit 226 that received the encrypted data decrypts the encrypted data. Accordingly, the second encryption and decryption unit 226 uses the solution received from the second solution generation unit 223 earlier as explained above.

The second encryption and decryption unit 226 decrypts the encrypted data using the solution. A method of decryption executed by the second encryption and decryption unit 226 is changed by using the solution.

The manner the solution is used in this case follows the manner the solution is used in the first encryption and decryption unit 126 of the client 100. In this embodiment, the client 100 and the server 200 use the solution as the common key for the common key system encrypted communication.

In any case, the encrypted data is decrypted by the second encryption and decryption unit 226, and is converted back into the original plaintext data of the banking information.

As explained above, a plurality of solutions are sometimes sent to the second encryption and decryption unit 226 from the second solution generation unit 223. In that case, the second encryption and decryption unit 226 attempts decryption of the encrypted data using all the solutions. If eleven solutions are present in the second encryption and decryption unit 226, only one solution among the eleven solutions is, so to speak, a "correct" solution used when the encrypted data is generated in the client 100. The other solutions are "wrong solutions". As a result of attempting the decryption in a round robin manner using all the solutions, a solution that successfully correctly decrypts the encrypted data is a correct solution. The second encryption and decryption unit 226 leaves the correct solution and deletes the other solutions. Consequently, the second encryption and decryption unit 226 can execute the processing of the decryption using the correct solution thereafter.

The data of the banking information is sent from the second encryption and decryption unit 226 to the output unit 227, is sent from the output unit 227 to other device that performs Internet banking processing via the interface, and is suitably used.

Next, the case is described where encrypted data is transmitted from the server 200 to the client 100. Simply put, this processing is opposite to the processing performed when the encrypted data is transmitted from the client 100 to the server 200.

The data of the banking information is input to the server 200. The data of the banking information is created by a device other than the server 200 that performs Internet banking processing, and is input to the server 200. The banking information is, for example, information indicating the balance of a certain account, information indicating how much money was transferred to which account, past transaction history of an account, etc. The banking information about these is plaintext data at the stage of generation.

The data of the banking information is sent from the interface to the input unit 221, and is further sent to the second encryption and decryption unit 226. The data of the banking information is encrypted. The solution explained above, which the encryption and decryption unit 226 already has, is used to encrypt the data of the banking information. The solution used here may be the same as the previous solution.

The second encryption and decryption unit 226 encrypts the banking information to convert it into encrypted data by the same method used by the first encryption and decryption unit 126 to encrypt the banking information. The generated encrypted data is sent from the second encryption and decryption unit 226 to the output unit 227.

The output unit 227 sends the encrypted data to the transmission and reception mechanism via the interface. The encrypted data is sent to the client 100 via the network 400.

The client 100 receives the encrypted data sent from the server 200 with its transmission and reception mechanism. The encrypted data is sent from the transmission and reception mechanism to the input unit 121 via the interface. The input unit 121 sends the encrypted data to the first encryption and decryption unit 126.

The first encryption and decryption unit 126 that received the encrypted data decrypts the encrypted data. In order to do so, the first encryption and decryption unit 126 uses the solution generated by the first solution generation unit 123. The solution in this case may be the solution, which the first solution generation unit 123 already has.

The first encryption and decryption unit 126 uses the solution as, for example, a key at the time of decryption of the encrypted data in the common key system to decrypt the encrypted data, and converts the encrypted data back to the original plaintext data of the banking information.

The data of the banking information is sent from the first encryption and decryption unit 126 to the output unit 127, and is sent from the output unit 127 to the display 101 via the interface 114. Based on the banking information sent from the server 200, the balance of a user's account, how much money was transferred to a certain account, or past transaction history of the user's account, etc. are displayed on the display 101.

The encrypted communication is terminated when it becomes unnecessary to perform the encrypted communication.

Note that, in the communication system in this embodiment, only one solution or a fixed solution is used for the solution used in the processes of S1004, 2003 in which the encrypted communication is performed. Instead of this, it is also possible to perform the encrypted communication using a plurality of solutions while changing the solutions. In that case, the client 100 and the server 200 need to change the solutions while synchronizing the solutions.

For example, it is assumed that encrypted data is transmitted from the client 100 to the server 200 for the second time.

In this case, as explained above, data of banking information is sent from the input unit 121 to the first encryption and decryption unit 126. The encryption and decryption unit 126 sends an instruction to generate a solution to the first solution generation unit 123. When receiving this instruction, the first solution generation unit 123 generates a new solution. When generating a solution, for example, the first solution generation unit 123 designates a new date and time. A rule about what kind of date and time is designated is shared by the first solution generation unit 123 of the client 100 and the second solution generation unit 223 of the server 200.

The first solution generation unit 123 reads out the initial solution from the first solution generation unit 123 and designates, as time for generating a solution, for example, a date and time obtained by "adding one minute" to 18:12, Sep. 17, 2017, which is the date and time designated some time ago. This time does not need to be time at that point in time. Naturally, the "addition of one minute" is illustration. Whatever time may be added or subtracted, for example, "one day" may be added or "one month" may be subtracted.

The first solution generation unit 123 sends a solution generated anew to the first encryption and decryption unit 126. The first encryption and decryption unit 126 determines a method of encryption using this solution and encrypts the banking information. Consequently, the banking information changes to encrypted data.

This encrypted data is sent from the client 100 to the server 200 as explained above and sent to the second encryption and decryption unit 226 in the server 200.

The second encryption and decryption unit 226, which receives the encrypted data, gives an instruction to generate a solution to the second solution generation unit 223. When receiving this instruction, the second solution generation unit 223 generates a new solution. When generating a solution, for example, the second solution generation unit 223 designates a new date and time. As explained above, a rule about what kind of date and time is designated is shared by the first solution generation unit 123 of the client 100 and the second solution generation unit 223 of the server 200.

Therefore, according to the example explained above, a solution generated in the server 200 is generated by designating a date and time obtained by "adding one minute" to 18:12, Sep. 17, 2017 explained above. If the second solution generation unit 223 of the server 200 is configured to generate a plurality of solutions, in that case, the second solution generation unit 223 designates a date and time obtained by "adding one minute" to the date and time designated when the "correct" solution is generated and generates a new solution. The new solution generated by the second solution generation unit 223 in this way is naturally the same as the new solution generated in the client 100.

The second solution generation unit 223 sends this solution to the second encryption and decryption unit 226. The second encryption and decryption unit 226 determines a method of decryption using this new solution and decrypts the encrypted data. This new solution is the same as the solution generated in the client 100 and used by the first encryption and decryption unit 126 when the encrypted data is generated. Therefore, the second encryption and decryption unit 226 can correctly decrypt the encrypted data.

In this way, a new solution can be used every time the encrypted data is transmitted from the client 100 to the server 200.

Similarly, when encrypted data is transmitted from the server 200 to the client, a solution generated anew can be used every time the encrypted data is transmitted.

In this way, even during one communication performed between the client 100 and the server 200, it is possible to change methods of encryption and decryption. Consequently, the security of the encrypted communication is further improved.

Furthermore, timing for changing the methods of the encryption and the decryption does not need to be every time the encrypted data is sent from one to the other of the client 100 and the server 200. A solution may be changed every time the encrypted data is transmitted from one to the other of the client 100 and the server 200 a predetermined number of times or a solution may be changed every time a predetermined time elapses from a date and time designated by the first solution generation unit 123 and the second solution generation unit 223 when a first solution is generated.

In the example explained above, basically, the initial solution recorded in the first initial-solution recording unit 124 in the client 100 and the initial solution linked with the identification information of the user having the client 100 recorded in the second initial-solution recording unit 224 are always fixed. The client 100 and the server 200 are capable of rewriting such initial solutions while synchronizing with each other, that is, while keeping a condition that the initial solutions are the same.

For example, when reading out the initial solution from the first initial-solution recording unit 124 and generating a solution, the first solution generation unit 123 is capable of always overwriting the initial solution recorded in the first initial-solution recording unit 124 with the solution generated anew. In this case, when reading out the initial solution from the second initial-solution recording unit 224 and generating a solution, the second solution generation unit 223 always overwrites, among the solutions recorded in the second initial-solution recording unit 224, the read-out initial solution with the solution generated anew.

If the client 100 and the server 200 are configured to generate a new solution every time encrypted data is transmitted from one to the other of the client 100 and the server 200 as explained above, the first solution generation unit 123 is capable of overwriting the initial solution recorded in the first initial-solution recording unit 124 with a solution generated last during the communication. In this case, the second solution generation unit 223 overwrites the initial solution recorded in the second initial-solution recording unit 224 with the solution generated last during the communication.

Naturally, these are illustrations. However, the client 100 and the server 200 are capable of changing the initial solutions as well by sharing some rule for update of the initial solution. It is obvious that this also improves the security of the encrypted communication.

Modification 1

A communication system in a modification 1 is explained.

The communication system in the modification 1 is almost the same as the communication system in the embodiment explained above. As in the case of the embodiment explained above, the communication system in the modification 1 is configured by the large number of client 100 and the server 200.

Hardware configurations of the client 100 and the server 200 and functional blocks generated on the insides thereof are the same as those in the case of the embodiments explained above.

The client 100 and the server 200 in the modification 1 are different only in that the client 100 and the server 200 treat synchronization information. Because of such a difference, a part of the functional blocks in the client 100 and the server 200 in the modification 1 is slightly different from the case of the embodiment explained above in functions of the functional blocks.

In the client 100 in the modification 1, a functional block having a function different from the function in the embodiment explained above is mainly the first solution generation unit 123. In the server 200 in the modification 1, a functional block having a function different from the function in the embodiment explained above is mainly the second solution generation unit 223.

Based on the above, a method of using the communication system in the modification 1 and the operation of the communication system are explained.

A user about to use Internet banking inputs a user ID, which is identification information (S1001). This process may be the same as the process in the embodiment explained above. Data of the identification information is sent to the input unit 121 via the interface 114 and sent from the input unit 121 to the main control unit 122.

When receiving the identification information, the main control unit 122 sends the identification information to the output unit 127.

On the other hand, when sending the identification information received from the input unit 121 to the output unit 127, the main control unit 122 of the client 100 sends an instruction to generate a solution to the first solution generation unit 123. The first solution generation unit 123, which receives such an instruction, generates a solution (S1003). A method of generating a solution is the same as the method in the case of the embodiment explained above. A date and time designated by the first solution generation unit 123 when generating a solution is "a date and time at that point in time when the first solution generation unit 123 is about to generate a solution". In the modification 1, as in the embodiment, the generated solution is sent to the first encryption and decryption unit 126.

The first solution generation unit 123 in the modification 1 performs processing not performed in the embodiment explained above. The first solution generation unit 123 generates, as synchronization information, information for specifying "a date and time at that point in time when the first solution generation unit 123 is about to generate a solution" and sends the synchronization information to the output unit 127. Referring to the embodiment explained above as an example, the information for specifying a date and time 18:12, Sep. 17, 2017 is the synchronization information.

The output unit 127 sends not only the identification information received earlier but also the synchronization information to the server 200. Since the synchronization information is sent together with the identification information, this process is slightly different from the processing in S1002 in the embodiment explained above in which only the identification information is sent. Note that, in the embodiment explained above, whichever of the processing in S1002 and the processing in S1003 may be performed first. However, in the modification 1, the processing in S1002 is executed after the processing in S1003.

The server 200 receives the identification information and the synchronization information. Since the server 200 receives not only the identification information but also the synchronization information, the processing is different from the processing in S2001 in the first embodiment.

When receiving the identification information and the synchronization information, the server 200 generates a solution. The identification information and the synchronization information are sent from the input unit 221 to the second solution generation unit 223 through the main control unit 222 together with an instruction to generate a solution.

The second solution generation unit 223, which receives the instruction, generates a solution (S2002). Processing for generating a solution executed by the second solution generation unit 223 is basically the same as the processing in the case of the embodiment explained above. The only difference is a date and time designated by the second solution generation unit 223 when generating a solution. In the embodiment explained above, the second solution generation unit 223 is configured to select, as a date and time designated when generating a solution, "a date and time at that point in time when the second solution generation unit 223 is about to generate a solution" or a date and time of several minutes before and after the date and time. Differently from this, the second solution generation unit 223 is configured to select "a date and time specified by synchronization information" as a date and time designated when generating a solution.

Naturally, the date and time thereby designated in the second solution generation unit 223 always coincides with the date and time designated when generating a solution in the first solution generation unit 123. Consequently, even if the second solution generation unit 223 generates only one solution, the second solution generation unit 223 can always generate the same solution as the solution generated by the first solution generation unit 123. If such synchronization information is used, a solution may change in second units or 0.01 second units, let alone, minute units.

The generated solution is sent from the second solution generation unit 223 to the second encryption and decryption unit 226.

The processing in S1004 and S2003 concerning the encrypted communication in the modification 1 and subsequent modifications is the same as the processing in the case of the embodiment explained above.

Note that the synchronization information in the modification 1 is "a date and time at that point in time when the first solution generation unit 123 is about to generate a solution". However, the synchronization information does not need to be the date and time.

For example, the synchronization information can be synchronization information for specifying an appropriate date and time, which may be a date and time long ago or may be a date and time far in future. To enable the first solution generation unit 123 and the second solution generation unit 223 to generate the same solution in a synchronized state, although a designated date and time may be any date and time, it is necessary to only designate the same date and time when generating a solution. Therefore, for example, the first solution generation unit 123 can generate a solution designating the date and time, for example, at random and set, as the synchronization information, information for specifying the date and time designated at random. The second solution generation unit 223 of the server 200, which receives the synchronization information together with the identification information, can generate a solution designating the date and time specified by the synchronization information to generate the same solution as the solution generated by the first solution generation unit 123.

The synchronization information does not always need to be information for specifying a certain date and time.

For example, it is assumed that, the first solution generation unit 123 and the second solution generation unit 223 generate different solutions in "minute" units, and it is guaranteed that the clocks of the client 100 and the server 200 are accurate and there is substantially no time lag of communication between the client 100 and the server 200. In such a case, as explained above, a problem occurs, for example, when a solution is generated by the first solution generation unit 123 of the client 100 at 20:41:59, Oct. 3, 2017 designating 20:41, Oct. 3, 2017 and a solution is generated by the second solution generation unit 223 of the server 200 at 20:42:02, Oct. 3, 2017 designating 20:42:02, Oct. 3, 2017. In this way, when timing when a solution is generated in the client 100 is near timing across a minute, it is likely that solutions generated in the client 100 and the server 200 are different. In such a case, the synchronization information sent from the client 100 to the server 200 can be set to information of "former half" or "latter half". The "former half" is information for specifying that a solution is generated in a former half thirty seconds of a certain minute. The "latter half" is information for specifying that a solution is generated in a latter half thirty seconds of a certain minute. The second solution generation unit 223 of the server 200, which receives such information, can grasp, from the synchronization information, whether the date and time specified when the first solution generation unit 123 of the client 100 generates the solution is 20:41, Oct. 3, 2017 or 20:42, Oct. 3, 2017. Even if timing when the server 200 receives the identification information and the synchronization information from the client 100 is timing at an interval of change from 20:41, Oct. 3, 2017 to 20:42, Oct. 3, 2017, if the synchronization information is the "former half", the date and time designated by the first solution generation unit 123 can be specified as 20:42, Oct. 3, 2017 and, if the synchronization information is the "latter half", the date and time designated by the first solution generation unit 123 can be specified as 20:41, Oct. 3, 2017.

The synchronization information may be a part of the solution.

In the example explained above, the first solution generation unit 123 generates the synchronization information. Similarly, even when the synchronization information is a part of the solution, the first solution generation unit 123 generates the synchronization information. Even in this case, the first solution generation unit 123 of the client 100 generates a solution before the identification information is transmitted from the client 100 to the server 200. At this time, the first solution generation unit 123 of the client 100 generates a solution designating "a date and time at that point in time when the first solution generation unit 123 is about to generate a solution". The solution generated by the first solution generation unit 123 is sent to the first encryption and decryption unit 126 as explained above. On the other hand, the first solution generation unit 123 generate a partial solution from the generated solution. The partial solution is a part extracted from the solution. The partial solution can be generated by the same method as a method explained below in a modification 2 and can be set the same as a partial solution explained below in the modification 2. In order to generate the partial solution, it is also naturally possible to provide, in the functional blocks of the client 100 in the modification 1, a first partial-solution generation unit 125 explained in the modification 2.

When transmitting the identification information from the client 100 to the server 200, the client 100 sends the partial solution generated by the first solution generation unit 123 to the server 200 together with the identification information. The server 200 receives the partial solution and the identification information. The partial solution is sent from the input unit 221 to the main control unit 222 and sent from the main control unit 222 to the second solution generation unit 223 together with the identification information. The second solution generation unit 223, which receives the partial solution and the identification information, generates a solution with the same method as the method in the case of the embodiment explained above. In this case, the second solution generation unit 223 generates a plurality of solutions designating a date and time in a certain degree of a range before and after a date and time when the server 200 receives the identification information. Among the plurality of solutions, a solution including the partial solution is present. The second solution generation unit 223 selects the solution including the partial solution and deletes the remaining solutions. The second solution generation unit 223 sends the selected solution to the second encryption and decryption unit 226.

Consequently, the first encryption and decryption unit 126 of the client 100 and the second encryption and decryption unit 226 of the server 200 share the same solution. The same processing as the processing in S1004 and S2003 concerning the encrypted communication explained in the first embodiment is performed thereafter.

If there is a concern about security in using, for the encrypted communication, the solution including the partial solution transmitted in the network 400, the client 100 and the server 200 can generate a new solution in synchronization and use the new solution for the encrypted communication.

Modification 2

A communication system in a modification 2 is explained.

The communication system in the modification 2 is almost the same as the communication system in the embodiment explained above. As in the case of the embodiment explained above, the communication system in the modification 2 is configured by the large number of clients 100 and the server 200.

Hardware configurations of the client 100 and the server 200 are the same as the hardware configuration in the embodiment explained above. However, in the modification 2, functional blocks generated on the insides of the client 100 and the server 200 are different from the functional blocks in the case of the embodiment explained above.

The first partial-solution generation unit 125 absent in the case of the embodiment explained above is present in the client 100 in the modification 2. A second partial-solution generation unit 225 and an authentication unit 228 absent in the case of the embodiment explained above are present in the server 200 in the modification 2.

Figure 9:
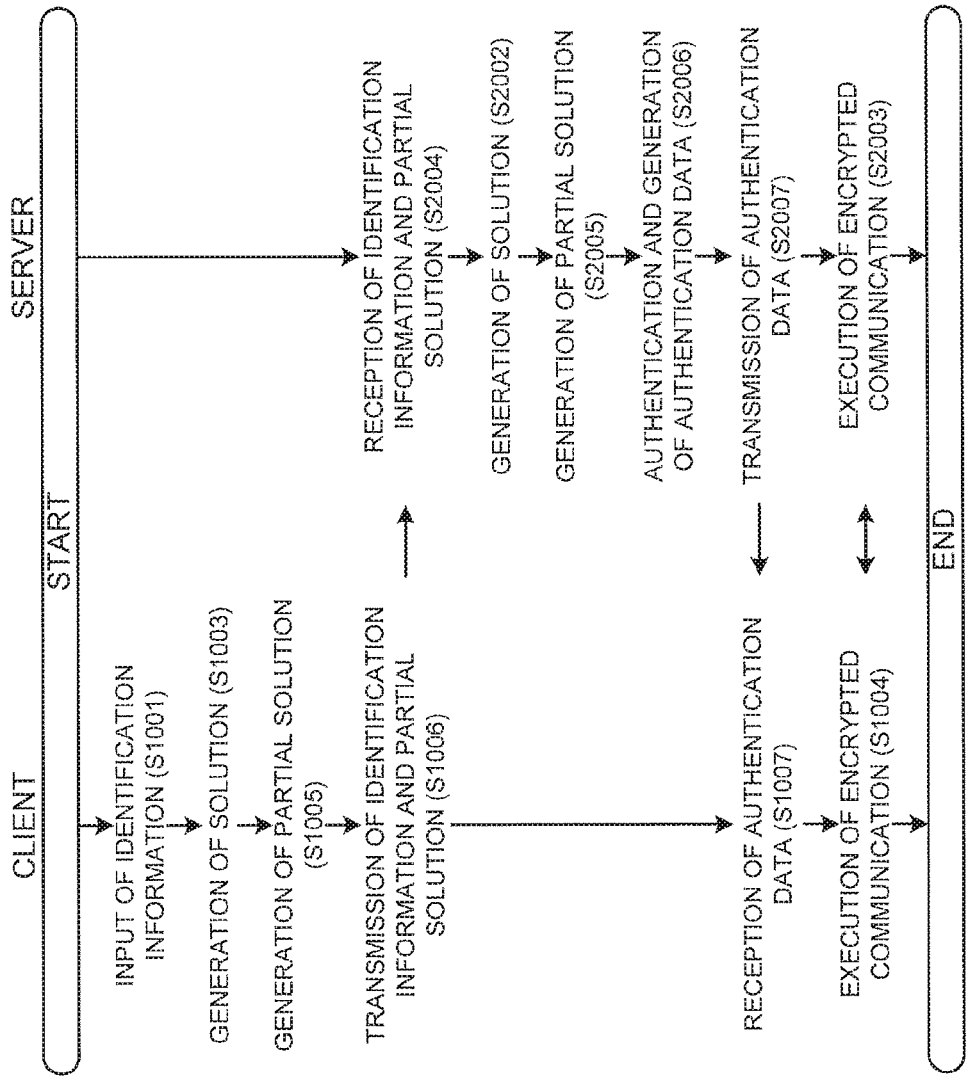
FIG. 9 is a diagram showing a flow of processing executed when communication is performed by the communication system in the modification 2.

Since these units are present, the communication system in the modification 2 can execute processing of authentication using the partial solution as explained below. Based on that point, a method of using the communication system in the modification 2 and the operation of the communication system are explained with reference to FIG. 9 while referring to functions of the functional blocks explained above.

A user about to use Internet banking inputs a user ID, which is identification information (S1001). This process may be the same as the process in the embodiment explained above. Data of the identification information is sent to the input unit 121 via the interface 114 and sent from the input unit 121 to the main control unit 122.

When receiving the identification information, the main control unit 122 sends the identification information to the output unit 127.

On the other hand, when sending the identification information received from the input unit 121 to the output unit 127, the main control unit 122 of the client 100 sends an instruction to generate a solution to the first solution generation unit 123. The first solution generation unit 123, which receives such an instruction, generates a solution (S1003). A method of generating a solution is the same as the method in the case of the embodiment explained above. In the embodiment explained above, the generated solution is sent to the first encryption and decryption unit 126. However, in the modification 2, unlike the case of the embodiment explained above, the generated solution is sent from the first solution generation unit 123 to both of the first encryption and decryption unit 126 and the first partial-solution generation unit 125.

When receiving the solution, the first partial-solution generation unit 125 generates a partial solution (S1005). The partial solution is a solution obtained by extracting an appropriate number of characters or the like from characters or the like forming the solution. A method with which the first partial-solution generation unit 125 generates a partial solution from the solution may be any method. The method does not always have to be the same. However, a method of generating a solution needs to be shared with the second partial-solution generation unit 225. The method of generating a partial solution from the solution can be, for example, when it is assumed that the solution is generated by twenty digits (twenty characters), extracting first ten digits of the solution, extracting only odd-number digits, extracting second to ninth digits, or extracting only numbers from a solution mixed with alphanumerical characters.

After generating the partial solution, the first partial-solution generation unit 125 sends the partial solution to the output unit 127.

As explained above, the output unit 127 receives the identification information from the main control unit 122. The output unit 127 receives the partial solution from the first partial-solution generation unit 125. The output unit 127, which receives the partial solution and the identification information, sends data of the partial solution and the identification information to the interface 114 in order to collectively and simultaneously send the partial solution and the identification information to the server 200.

The data of the partial solution and the identification information are sent from the interface 114 to the transmission and reception mechanism. After being attached with a header or the like in the transmission and reception mechanism according to a technique usually used in normal communication of the Internet, the data is sent from the transmission and reception mechanism to the server 200 via the network 400 (S1006).

The server 200 receives, with the transmission and reception mechanism, the data of the partial solution and the identification information sent from the client 100 (S2004). More specifically, the server 200 collectively and simultaneously receives, with the transmission and reception mechanism, the partial solution and the identification information sent from the client 100.

The data of the partial solution and the identification information are sent to the interface of the server 200 and sent from the interface to the input unit 221. When receiving the data of the partial solution and the identification information from the interface, the input unit 221 sends the data of the partial solution and the identification information to the main control unit 222.

When receiving the data of the partial solution and the identification information from the input unit 221, the main control unit 222 sends the data of the partial solution to the authentication unit 228 and sends the identification information and an instruction to generate a solution to the second solution generation unit 223.

When receiving the instruction to generate a solution together with the identification information, the second solution generation unit 223 generates a solution (S2002).

A method with which the second solution generation unit 223 generates a solution may be the same as the method in the case of the embodiment explained above. Depending on a case, as in the case of the embodiment explained above, the second solution generation unit 223 generates a plurality of solutions.

The second solution generation unit 223 sends the generated solution to the second encryption and decryption unit 226 and the second partial-solution generation unit 225.

When receiving the solution, the second partial-solution generation unit 225 generates a partial solution from the solution (S2005). A method with which the second partial-solution generation unit 225 generates a partial solution from the solution is the same as the method with which the first partial-solution generation unit 125 of the client 100 generates a partial solution from the solution.

When the second partial-solution generation unit 225 generates the partial solution from the solution, the second partial-solution generation unit 225 sends the partial solution to the authentication unit 228. When receiving the plurality of solutions from the second solution generation unit 223, the second partial-solution generation unit 225 generates a plurality of partial solutions and sends all the partial solutions to the authentication unit 228.

The authentication unit 228 receives the partial solution generated in the client 100 from the main control unit 222. The authentication unit 228 receives the partial solution generated in the server 200 from the second partial-solution generation unit 225.

The authentication unit 228 performs authentication using the partial solutions (S2006).

The authentication unit 228 compares the partial solution generated in the client 100 with the partial solution generated in the server 200. When the former coincides with the latter, the authentication unit 228 authenticates that the client 100, which sends the partial solution, is proper. When the former does not coincide with the latter, the authentication unit 228 does not authenticate that the client 100, which sends the partial solution, is proper. When the authentication unit 228 receives the plurality of partial solutions from the second partial-solution generation unit 225, the authentication unit 228 compares the partial solution generated in the client 100 with the plurality of partial solutions generated in the server 200. When the former coincides at least one solution of the latter, the authentication unit 228 authenticates that the client 100, which sends the partial solution, is proper. When the former does not coincide with all the solutions of the latter, the authentication unit 228 does not authenticate that the client 100, which sends the partial solution, is proper.

The authentication can be performed in this way because it is guaranteed that the first solution generation unit 123 of the client 100 and the second solution generation unit 223 of the server 200 can always generate the same solution or the same partial solution generated based on the same solution if the same initial value and the same designated date and time are used. When the client 100 successfully generates the same partial solution as the partial solution generated by the server 200, this means that the client 100 is authentic. Therefore, the authentication scheme explained above can hold. Moreover, in such an authentication scheme, only a part of the solution is transmitted via the network 400 and the entire solution is not transmitted via the network 400. Therefore, even if a partial solution of the solution is stolen by a malicious outsider, damage of the theft is limited. It is less likely that a method of generating a solution is penetrated by the outsider. However, if the security is ignored more or less, rather than the partial solution, the solution may be sent from the client 100 to the server 200. In that case, the first partial-solution generation unit 125 and the second partial-solution generation unit 225 are unnecessary. The authentication unit 228 compares the solution sent from the client 100 and the solution generated in the server 200.

Note that, if the synchronization information explained in the modification 1 is used, the server 200 only has to generate one solution.

When the authentication is performed, the authentication unit 228 generates authentication data, which is data indicating that the authentication is performed concerning the client 100, and sends the authentication data to the main control unit 222 and the output unit 227. When the authentication is not performed, the communication between the client 100 and the server 200 is terminated there. The user operates the client 100 to return to the processing of inputting the identification information, which is the user ID.

The authentication data is sent to the output unit 227 as explained above. When receiving the authentication data, the output unit 227 outputs the authentication data to the interface. The authentication data is sent from the interface to the transmission and reception mechanism and sent from the transmission and reception mechanism to the client 100 via the network 400 (S2007).

The client 100 receives the authentication data sent from the server 200. More specifically, the client 100 receives the authentication data with the transmission and reception mechanism thereof (S1007).

The authentication data is sent from the transmission and reception mechanism to the input unit 121 through the interface 114. The input unit 121 sends the authentication data to the main control unit 122. The main control unit 122, which receives the authentication data, instructs the first encryption and decryption unit 126 that the first encryption and decryption unit 126 may perform encryption and decryption.

In this state, the encrypted communication is performed between the client 100 and the server 200 (S1004 and S2003).

In this state, the first encryption and decryption unit 126 and the second encryption and decryption unit 226 have the same solution as in the case of the embodiment explained above. Therefore, as in the case of the embodiment explained above, the first encryption and decryption unit 126 and the second encryption and decryption unit 226 are capable of performing the encrypted communication. That is, the following processing in the modification 2 may be the same as the processing in the case of the embodiment explained above.

However, in the modification 2, a part of the solution shared by the first encryption and decryption unit 126 and the second encryption and decryption unit 226, the solution being used as a key in the encrypted communication of the common key scheme depending on a case, is transmitted on the network 400 as the partial solution. Therefore, from the viewpoint of security, it could be considered a problem to determine methods of encryption and decryption in the first encryption and decryption unit 126 and the second encryption and decryption unit 226 with the solution that the first encryption and decryption unit 126 and the second encryption and decryption unit 226 have. To avoid such a problem, the synchronized same solution only has to be provided to the first encryption and decryption unit 126 from the first solution generation unit 123 and provided to the second encryption and decryption unit 226 from the second solution generation unit 223 by the same method as the method explained above.

The invention claimed is:

1. A first communication device constituting a communication system in combination with a second communication device, the first communication device and the second communication device being enabled to communicate with each other via a predetermined network, the first communication device comprising:

first initial-solution recording means for recording an initial solution, which is data used to generate a solution in which a predetermined number of at least one of characters, numbers, and signs are enumerated;

first solution generation means for generating a new solution, which is always same when generated by designating a same date and time, based on the initial solution recorded by the first initial-solution recording means;

first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device, wherein the second communication device combined with the first communication device includes:

second initial-solution recording means for recording a same initial solution as the initial solution recorded by the first initial-solution recording means of the first communication device;

second solution generation means for generating a new solution, which is always same when generated by designating a same date and time, based on the initial solution recorded by the second initial-solution recording means, the new solution being same as the new solution generated by the first solution generation means of the first communication device;

second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data;

second transmission and reception means for executing at least one of processing for transmitting the encrypted data generated by the second encryption and decryption means to the first communication device and processing for receiving the encrypted data from the first communication device; and the first communication device comprising synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

2. The first communication device according to claim 1, wherein the synchronization information is information for specifying a date and time designated when at least a solution used first in the first encryption and decryption means is generated.

3. The first communication device according to claim 2, wherein the synchronization information is information for specifying a date and time at that point in time.

4. The first communication device according to claim 2, wherein the synchronization information is a part of the solution generated by the first solution generation means.

5. The first communication device according to claim 1, wherein the first solution generation means is configured to generate the solution generated by designating a date and time at that point in time or a solution for authentication, which is a part of the solution, and the first transmission and reception means is configured to transmit the solution for authentication to the second communication device, and the second transmission and reception means of the second communication device combined with the first communication device is configured to receive the solution for authentication, and the second communication device includes authentication means for, when the second solution generation means successfully generates the same solution as the solution for authentication or a part of the solution, authenticating that the first communication device, which sends the solution for authentication to the second communication device, is authentic.

6. The first communication device according to claim 1, wherein the first solution generation means is configured to generate a plurality of solutions, and the first encryption and decryption means is configured to perform at least one of processing for, when encrypting a piece of the transmission target data, executing a plurality of methods for encryption based on the plurality of solutions generated by the first solution generation means and processing for, when decrypting a piece of the encrypted data, executing a plurality of methods for decryption based on the plurality of solutions generated by the first solution generation means, and the second solution generation means of the second communication device combined with the first communication device is configured to generate a plurality of solutions, and the second encryption and decryption means is configured to perform at least one of processing for, when encrypting a piece of the transmission target data, executing a plurality of methods for encryption based on the plurality of solutions generated by the second solution generation means and processing for, when decrypting a piece of the encrypted data, executing a plurality of methods for decryption based on the plurality of solutions generated by the second solution generation means.

7. A second communication device constituting a communication system in combination with a first communication device, the second communication device and the first communication device being enabled to communicate with each other via a predetermined network, the first communication device combined with the second communication device including:

first initial-solution recording means for recording an initial solution, which is data used to generate a solution in which a predetermined number of at least one of characters, numbers, and signs are enumerated;

first solution generation means for generating a new solution, which is always same when generated by designating a same date and time, based on the initial solution recorded by the first initial-solution recording means;

first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device, the second communication device comprising:

second initial-solution recording means for recording a same initial solution as the initial solution recorded by the first initial-solution recording means of the first communication device;

second solution generation means for generating a new solution, which is always same when generated by designating a same date and time, based on the initial solution recorded by the second initial-solution recording means, the new solution being same as the new solution generated by the first solution generation means of the first communication device;

second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data;

second transmission and reception means for executing at least one of processing for transmitting the encrypted data generated by the second encryption and decryption means to the first communication device and processing for receiving the encrypted data from the first communication device; and the first communication device comprising synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

8. A method executed in a first communication device constituting a communication system in combination with a second communication device, the first communication device and the second communication device being enabled to communicate with each other via a predetermined network, the method comprising processes executed by the first communication device including first initial-solution recording means for recording an initial solution, which is data used to generate a solution in which a predetermined number of at least one of characters, numbers, and signs are enumerated, the processes comprising:

a first solution generation process of generating a new solution, which is always same when generated by designating a same date and time, based on the initial solution recorded by the first initial-solution recording means;

first encryption and decryption process configured to change a method of encryption or decryption based on the solution generated in the first solution generation process, the first encryption and decryption process executing at least one of processing for encrypting transmission target data, which is a target of transmission, to generate encrypted data and processing for decrypting the encrypted data generated by the second communication device to generate transmission target data; and first transmission and reception process of executing at least one of processing for transmitting the encrypted data generated in the first encryption and decryption process to the second communication device and processing for receiving the encrypted data from the second communication device, wherein the second communication device combined with the first communication device includes:

second initial-solution recording means for recording a same initial solution as the initial solution recorded by the first initial-solution recording means of the first communication device;

second solution generation means for generating a new solution, which is always same when generated by designating a same date and time, based on the initial solution recorded by the second initial-solution recording means, the new solution being same as the new solution generated by the first solution generation means of the first communication device;

second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data;

second transmission and reception means for executing at least one of processing for transmitting the encrypted data generated by the second encryption and decryption means to the first communication device and processing for receiving the encrypted data from the first communication device; and the first communication device comprising synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

9. A method executed by a second communication device constituting a communication system in combination with a first communication device, the second communication device and the first communication device being enabled to communicate with each other via a predetermined network, the first communication device combined with the second communication device including:

first initial-solution recording means for recording an initial solution, which is data used to generate a solution in which a predetermined number of at least one of characters, numbers, and signs are enumerated;

first solution generation means for generating a new solution, which is always same when generated by designating a same date and time, based on the initial solution recorded by the first initial-solution recording means;

first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device, the method comprising processes executed by the second communication device including second initial-solution recording means for recording a same initial solution as the initial solution recorded by the first initial-solution recording means of the first communication device, the processes comprising:

a second solution generation process of generating a new solution, which is always same when generated by designating a same date and time, based on the initial solution recorded by the second initial-solution recording means, the new solution being same as the new solution generated by the first solution generation means of the first communication device;

second encryption and decryption process configured to change a method of encryption or decryption based on the solution generated in the second solution generation process, the second encryption and decryption process executing at least one of processing for encrypting transmission target data, which is a target of transmission, to generate encrypted data and processing for decrypting the encrypted data generated by the first communication device to generate transmission target data;

second transmission and reception process of executing at least one of processing for transmitting the encrypted data generated in the second encryption and decryption process to the first communication device and processing for receiving the encrypted data from the first communication device; and the first communication device comprising synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

10. A non-transitory computer media comprising a computer program for causing a predetermined computer to function as a first communication device constituting a communication system in combination with a second communication device, the first communication device and the second communication device being enabled to communicate with each other via a predetermined network, the computer program causing the computer to function as:

first initial-solution recording means for recording an initial solution, which is data used to generate a solution in which a predetermined number of at least one of characters, numbers, and signs are enumerated;

first solution generation means for generating a new solution, which is always same when generated by designating a same date and time, based on the initial solution recorded by the first initial-solution recording means;

first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device, wherein the second communication device combined with the first communication device includes:

second initial-solution recording means for recording a same initial solution as the initial solution recorded by the first initial-solution recording means of the first communication device;

second solution generation means for generating a new solution, which is always same when generated by designating a same date and time, based on the initial solution recorded by the second initial-solution recording means, the new solution being same as the new solution generated by the first solution generation means of the first communication device;

second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data;

second transmission and reception means for executing at least one of processing for transmitting the encrypted data generated by the second encryption and decryption means to the first communication device and processing for receiving the encrypted data from the first communication device; and the computer program causing the computer to function as:

synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

11. A non-transitory computer media comprising a computer program for causing a predetermined computer to function as a second communication device constituting a communication system in combination with a first communication device, the first communication device and the second communication device being enabled to communicate with each other via a predetermined network, the first communication device combined with the second communication device including:

first initial-solution recording means for recording an initial solution, which is data used to generate a solution in which a predetermined number of at least one of characters, numbers, and signs are enumerated;

first solution generation means for generating a new solution, which is always same when generated by designating a same date and time, based on the initial solution recorded by the first initial-solution recording means;

first encryption and decryption means configured to change a method of encryption or decryption based on the solution generated by the first solution generation means, the first encryption and decryption means executing at least one of processing for encrypting transmission target data, which is a target of transmission, to generate encrypted data and processing for decrypting the encrypted data generated by the second communication device to generate transmission target data; and first transmission and reception means for executing at least one of processing for transmitting the encrypted data generated by the first encryption and decryption means to the second communication device and processing for receiving the encrypted data from the second communication device, the computer program causing the computer to function as:

second initial-solution recording means for recording a same initial solution as the initial solution recorded by the first initial-solution recording means of the first communication device;

second solution generation means for generating a new solution, which is always same when generated by designating a same date and time, based on the initial solution recorded by the second initial-solution recording means, the new solution being same as the new solution generated by the first solution generation means of the first communication device;

second encryption and decryption means configured to change a method of encryption or decryption based on the solution generated by the second solution generation means, the second encryption and decryption means executing at least one of processing for encrypting transmission target data, which is a target of transmission, to generate encrypted data and processing for decrypting the encrypted data generated by the first communication device to generate transmission target data; and second transmission and reception means for executing at least one of processing for transmitting the encrypted data generated by the second encryption and decryption means to the first communication device and processing for receiving the encrypted data from the first communication device, wherein the first communication device comprises synchronization-information generation means for generating synchronization information for matching the solution generated by the second solution generation means of the second communication device with the solution generated by the first solution generation means, wherein the first transmission and reception means is configured to transmit the synchronization information to the second communication device prior to the first encryption and decryption means executing the processing for generating the encrypted data or the processing for generating the transmission target data, the second transmission and reception means of the second communication device combined with the first communication device is configured to receive the synchronization information from the first communication device, and the second solution generation means is configured to generate, using the synchronization information, based on the initial solution recorded by the second initial-solution recording means, the same solution as the solution generated by the first solution generation means of the first communication device prior to the second encryption and decryption means executing the processing for generating the encrypted data or the processing for generating the transmission target data.

\* \* \* \* \*